US012385931B2

(12) United States Patent
Zantos

(10) Patent No.: US 12,385,931 B2
(45) Date of Patent: Aug. 12, 2025

(54) BIOLOGICAL SAMPLE ANALYZER WITH ACCELERATED THERMAL WARMING

(71) Applicant: Siemens Healthcare Diagnostics Inc., Tarrytown, NY (US)

(72) Inventor: George Zantos, Medford, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 911 days.

(21) Appl. No.: 17/593,482

(22) PCT Filed: Mar. 16, 2020

(86) PCT No.: PCT/US2020/022914
§ 371 (c)(1),
(2) Date: Sep. 20, 2021

(87) PCT Pub. No.: WO2020/197815
PCT Pub. Date: Oct. 1, 2020

(65) Prior Publication Data
US 2022/0221475 A1    Jul. 14, 2022

Related U.S. Application Data

(60) Provisional application No. 62/822,379, filed on Mar. 22, 2019.

(51) Int. Cl.
*G01N 11/00*    (2006.01)
*B01L 7/00*    (2006.01)
*G01N 35/00*    (2006.01)

(52) U.S. Cl.
CPC .......... *G01N 35/00029* (2013.01); *B01L 7/00* (2013.01); *B01L 2200/147* (2013.01);
(Continued)

(58) Field of Classification Search
CPC .......................... B01L 7/52; B01L 2200/147
See application file for complete search history.

(56) References Cited

U.S. PATENT DOCUMENTS 3,607,099 A    9/1971    Scordato
3,616,264 A    10/1971    Ray et al.
(Continued)

FOREIGN PATENT DOCUMENTS

EP    1703284 A1    9/2006
EP    2739747 A1    6/2014
(Continued)

OTHER PUBLICATIONS

International Search Report and Written Opinion of International Application No. PCT/US2020/022914 dated Jul. 23, 2020.

*Primary Examiner* — Natalia Levkovich

(57) ABSTRACT

In one embodiment, a biological sample analyzer has a housing having at least one outer wall that defines a cavity therein. A receptacle, which can support a consumable holder containing a biological sample, is disposed within the cavity. At least one heater applies heat to the consumable holder when the consumable holder is supported by the receptacle. At least one heater sensor detects a temperature of the receptacle over time. A controller directs the at least one heater to apply an elevated temperature to the consumable holder and reduces an amount of heat applied to the consumable holder before the consumable holder exceeds a target temperature that is less than the elevated temperature. By applying the elevated temperature, the consumable holder can be heated quicker than if it where heated at only the target temperature.

13 Claims, 10 Drawing Sheets

(52) U.S. Cl.
CPC .............. *G01N 2035/00366* (2013.01); *G01N 2035/00376* (2013.01)

(56) References Cited

U.S. PATENT DOCUMENTS

| | | | |
|---|---|---|---|
| 3,677,706 | A | 7/1972 | Graff et al. |
| 3,971,630 | A | 7/1976 | Sandrock et al. |
| 4,116,775 | A | 9/1978 | Charles et al. |
| 4,708,886 | A | 11/1987 | Nelson |
| 4,865,986 | A * | 9/1989 | Coy ............... F25B 21/02 422/63 |
| 5,455,175 | A | 10/1995 | Wittwer et al. |
| 5,646,049 | A | 7/1997 | Tayi |
| 6,156,565 | A | 12/2000 | Maes et al. |
| 6,423,536 | B1 | 7/2002 | Jovanovich et al. |
| 8,845,984 | B2 | 9/2014 | Amshey et al. |
| 10,820,847 | B1 | 11/2020 | Andeshmand et al. |
| 2001/0007759 | A1 | 7/2001 | Wittwer et al. |
| 2004/0065655 | A1 | 4/2004 | Brown et al. |
| 2004/0115832 | A1 | 6/2004 | Shareef et al. |
| 2004/0151629 | A1 | 8/2004 | Pease et al. |
| 2004/0209331 | A1 | 10/2004 | Ririe |
| 2006/0065652 | A1 | 3/2006 | Brown |
| 2006/0073584 | A1 * | 4/2006 | Sasaki ............... B01L 7/52 435/303.1 |
| 2006/0148063 | A1 | 7/2006 | Fauzzi et al. |
| 2007/0064521 | A1 | 3/2007 | Miszenti |
| 2007/0148780 | A1 | 6/2007 | Murata et al. |
| 2007/0196237 | A1 | 8/2007 | Neuzil et al. |
| 2009/0022625 | A1 | 1/2009 | Lee et al. |
| 2010/0071443 | A1 | 3/2010 | Wrench et al. |
| 2012/0000836 | A1 | 1/2012 | Okado |
| 2012/0170608 | A1 | 7/2012 | Bianchessi et al. |
| 2012/0308990 | A1 | 12/2012 | TerMaat et al. |
| 2013/0040376 | A1 | 2/2013 | Amshey et al. |
| 2013/0130262 | A1 | 5/2013 | Battrell et al. |
| 2013/0224753 | A1 | 8/2013 | Ishizawa et al. |
| 2014/0030151 | A1 | 1/2014 | Horii et al. |
| 2014/0063737 | A1 | 3/2014 | Desmarets |
| 2014/0206412 | A1 | 7/2014 | DeJohn et al. |
| 2015/0140570 | A1 | 5/2015 | Fu et al. |
| 2015/0367314 | A1 | 12/2015 | Iketani et al. |
| 2015/0369674 | A1 | 12/2015 | Ma |
| 2016/0018426 | A1 | 1/2016 | Moriya et al. |
| 2016/0282376 | A1 | 9/2016 | Keller et al. |
| 2016/0325281 | A1 | 11/2016 | Lee et al. |
| 2017/0023281 | A1 | 1/2017 | Fromm et al. |
| 2019/0383844 | A1 | 12/2019 | Miyazaki et al. |
| 2021/0208034 | A1 | 7/2021 | Miyazaki et al. |
| 2021/0291178 | A1 | 9/2021 | Tsujimaru |
| 2022/0099689 | A1 | 3/2022 | Zantos et al. |
| 2022/0221475 | A1 | 7/2022 | Zantos et al. |

FOREIGN PATENT DOCUMENTS

| | | |
|---|---|---|
| JP | 2006125868 A | 5/2006 |
| JP | 2007526479 A | 9/2007 |
| JP | 2009109410 A | 5/2009 |
| JP | 2009282041 A | 12/2009 |
| JP | 2011191114 A | 9/2011 |
| JP | 2016024054 A | 2/2016 |
| JP | 2016191577 A | 11/2016 |
| JP | 2017181202 A | 10/2017 |
| WO | 2005064348 A1 | 7/2005 |
| WO | 2016024054 A1 | 2/2016 |
| WO | 2018017769 A1 | 1/2018 |
| WO | 2018169651 A1 | 9/2018 |
| WO | 2018208563 A1 | 11/2018 |

* cited by examiner

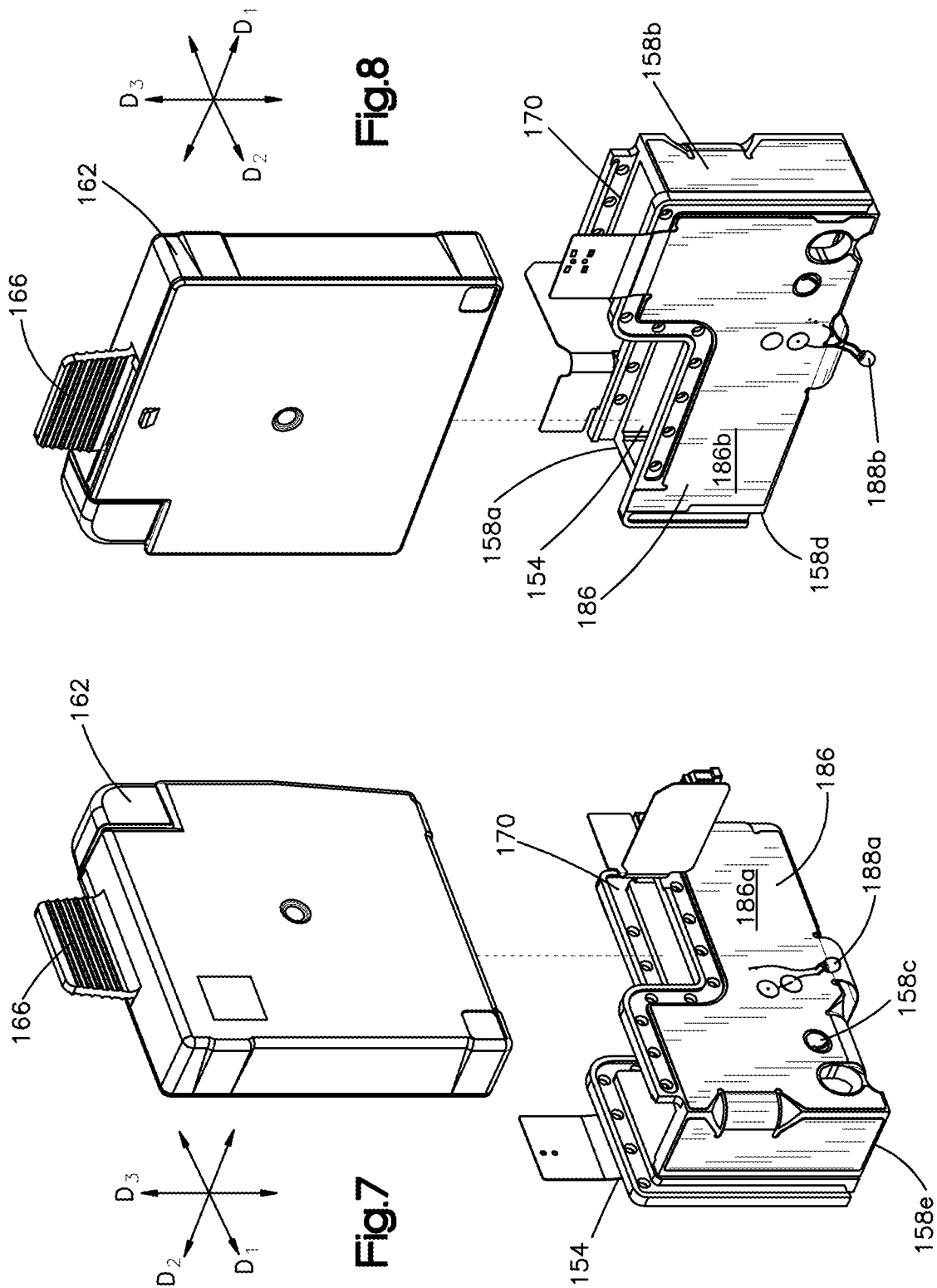

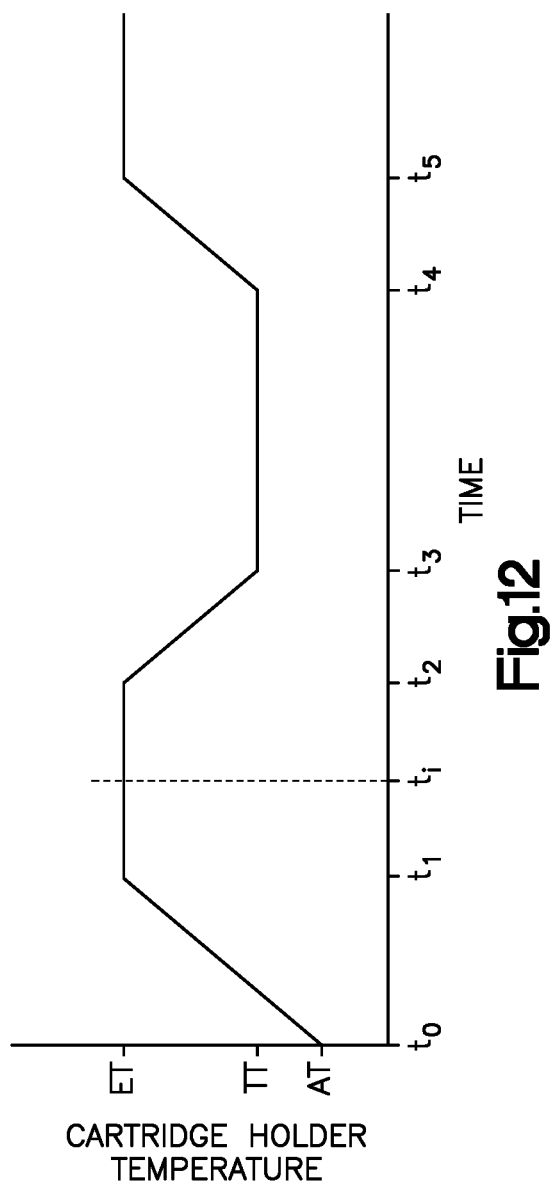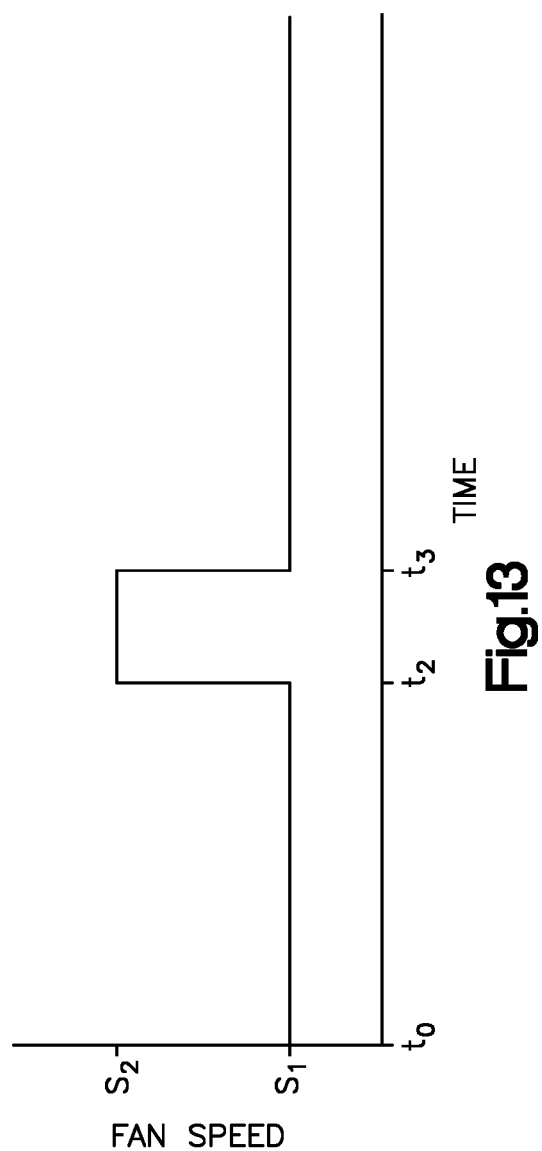

BIOLOGICAL SAMPLE ANALYZER WITH ACCELERATED THERMAL WARMING

This application claims priority to U.S. Provisional Application No. 62/822,379, filed Mar. 22, 2019, the disclosure of which is incorporated herein by reference in its entirety.

CROSS-REFERENCE TO RELATED CASES

This application is related to U.S. patent application Ser. No. 62/822,371, filed on the same date as the present application, and U.S. patent application Ser. No. 62/822,391, filed on the same date as the present application, the teachings of both of which are hereby incorporated by reference as if set forth in their entirety herein.

TECHNICAL FIELD

This disclosure generally relates to biological sample analyzers, and more particularly to heating of consumable biological sample holders used in biological sample analyzers.

BACKGROUND

In point-of-care services, a benchtop biological sample analyzer is commonly used to analyze biological samples of patients such as blood and urine. Typically, the biological sample is fed into a cartridge having a reagent therein. The cartridge is inserted into the analyzer, and the analyzer moves the cartridge so as to mix the sample with the reagent. Further, the analyzer heats the sample and reagent a target temperature, typically above room temperature, and then analyzes the heated sample.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 7 shows an exploded perspective view of the receptacle and consumable holder of the biological sample analyzer of FIG. 1;

FIG. 8 shows an alternative exploded perspective view of the receptacle and consumable holder of the biological sample analyzer of FIG. 1;

FIG. 12 shows a graphical representation of the temperature of heaters of the biological sample analyzer of FIG. 1 over time during a heating operation of the consumable holder; and FIG. 13 shows a graphical representation of the speed of a fan of the biological sample analyzer of FIG. 1 over time during a heating operation of the consumable holder.

DETAILED DESCRIPTION

Figure 1:
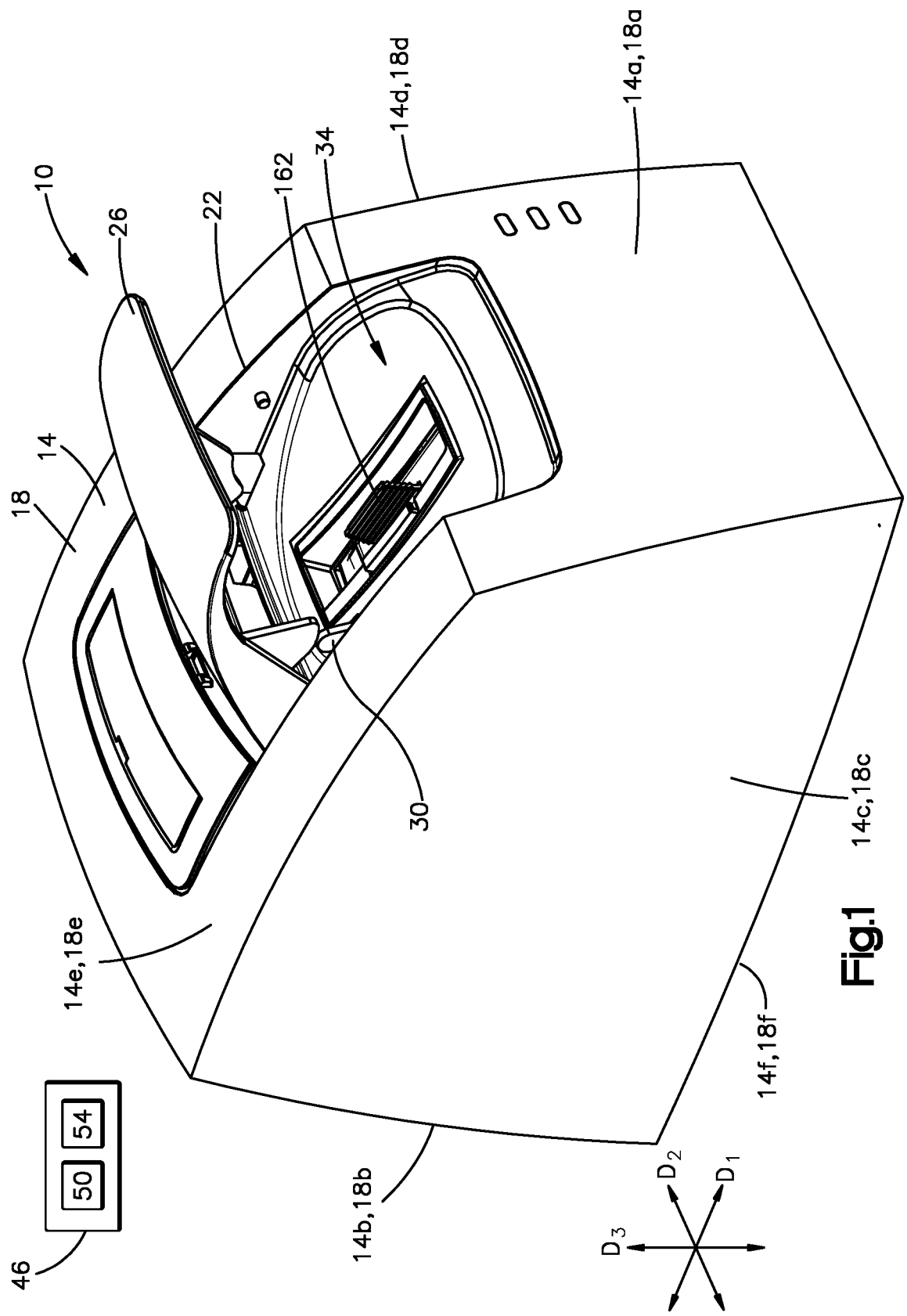
FIG. 1 shows a top perspective view of a biological sample analyzer according to an illustrative embodiment of the present disclosure.

In a conventional biological sample analyzer, the heaters of the analyzer are set to apply a target temperature to a diagnostic consumable holder such as a cartridge, card, or cassette, that holds a biological sample and reagent. The target temperature corresponds to the temperature at which the biological sample will be analyzed, and is typically above an ambient or room temperature. The diagnostic consumable holder is then permitted to reach the target temperature. However, heating the diagnostic consumable holder in such a manner can be time consuming, thereby delaying the time needed to obtain an analysis of the sample. Therefore, there is a desire to reduce the amount of time needed to heat the diagnostic consumable holder to the target temperature. One method of reducing the amount of time needed is to redesign the diagnostic consumable holder to have a smaller mass, which will heat quicker at a given temperature than a diagnostic consumable holder having a larger mass. However, redesigning the diagnostic consumable holder can render any unused diagnostic consumable holders obsolete, and can also necessitate a redesign of the biological sample analyzer.

As an alternative, the biological sample analyzer can be configured to accelerate heating of the diagnostic consumable holder by setting at least one heater of the analyzer to apply an elevated temperature that is greater than the target temperature. In some embodiments, the elevated temperature can correspond to a maximum heating capability of the at least one heater. However, care should be taken to not overheat the diagnostic consumable holder beyond the target temperature. Therefore, the biological sample analyzer can be configured to rapidly cool the at least one heater before the diagnostic consumable holder exceeds the target temperature. As described below, this can be accomplished, at least in part, by reducing the heating applied by the at least one heater. Additionally or alternatively, rapid cooling can be accomplished by causing a fan to force air over the at least one heater of the sample analyzer at a determined time before the diagnostic consumable holder exceeds the target temperature so as to cool the at least one heater to the target temperature. The fan can be operated at a first speed when the at least one heater is heating to the elevated temperature, and can be operated at a second speed that is faster than the first speed, when the heater is heating to the target temperature. The first speed can be zero or greater than zero, and thus, the fan can be moving or can be off when at the first speed. The air from the fan can be directed over the heaters through a plenum disposed within the sample analyzer.

A diagnostic consumable holder may have a relatively short shelf life (e.g., approximately eight weeks) when kept at room temperature. This may be due at least in part to the shelf life of a reagent held or contained in the diagnostic consumable holder. Therefore, the diagnostic consumable holder can be refrigerated so as to extend the shelf life of the diagnostic consumable holder (e.g., to approximately two years). However, conventional biological sample analyzers typically do not account for the lowered temperature of a refrigerated diagnostic consumable holder. As a result, the diagnostic consumable holder must be removed from the refrigerator for a period of time (e.g., ½ hour) prior to being inserted into a conventional biological sample analyzer so as to bring the diagnostic consumable holder to room temperature.

If the diagnostic consumable holder is not brought to room temperature, then the analyzer might not heat the diagnostic consumable holder to the target temperature. This can result in a bias or error in the analyzed results generated by the biological sample analyzer because the analysis is temperature sensitive. Alternatively, the analyzer might reject the diagnostic consumable holder, and as a result, the operator would need to obtain a new sample from the patient thereby resulting in delay. As described below, a sample analyzer of the present disclosure can be configured to detect a diagnostic consumable holder that has been refrigerated and inserted into the sample analyzer before the diagnostic consumable holder has warmed to an ambient temperature range (herein referred to as a "cold consumable holder"). As used herein, the term "cold consumable holder" is used to refer to a consumable holder that is below an ambient temperature range. In one embodiment, the ambient temperature range can be from about 15 degrees Celsius to about 32 degrees Celsius. In another embodiment, the ambient temperature range is a room temperature range of from about 20 degrees Celsius to about 25 degrees Celsius. The sample analyzer can further be configured to adjust heating of the diagnostic consumable holder so as to bring the diagnostic consumable holder to the target temperature before the sample is analyzed by the sample analyzer.

Described herein is a biological sample analyzer 10 that includes a receptacle 154 configured to receive a diagnostic consumable holder 162 with a biological sample disposed therein. In the figures, the diagnostic consumable holder 162 is shown as a cartridge; however, the diagnostic consumable holder 162 can be a cartridge, card, cassette, or any other suitable housing configured to retain a biological sample therein for analysis. At least one heater 186 is attached to the receptacle 154, and is configured to heat the receptacle 154. At least one heater sensor 188 is attached to the receptacle 154, and is configured to detect an instantaneous temperature of the receptacle 154. Certain terminology is used to describe the biological sample analyzer 10 in the following description for convenience only and is not limiting. The words "lower" and "upper" designate directions with respect to the orientation shown in the drawings. The words "inner" and "outer" refer to directions toward and away from, respectively, the geometric center of the part being described.

Unless otherwise specified herein, the terms "longitudinal," "lateral," and "vertical" and are used to describe the orthogonal directional components of various components of the biological sample analyzer 10, as designated by the first direction $D_1$, second direction $D_2$, and third direction $D_3$. It should be appreciated that while the first and second directions $D_1$, $D_2$ are illustrated as extending along a horizontal plane, and the third direction $D_3$ is illustrated as extending along a vertical plane, the planes that encompass the various directions may differ during use.

Figure 2:
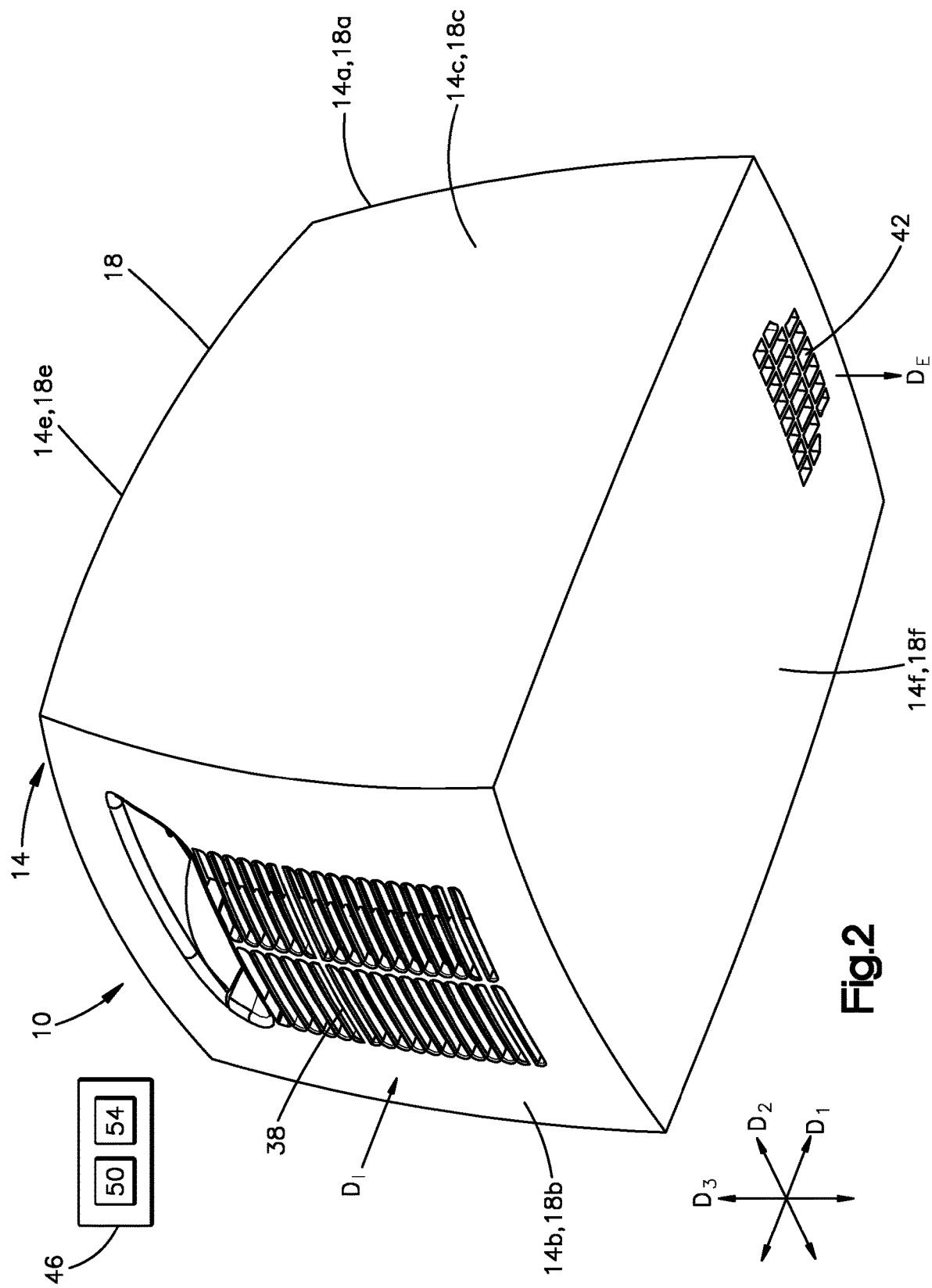
FIG. 2 shows a bottom perspective view of the biological sample analyzer shown in FIG. 1.

Referring to FIGS. 1 and 2, a biological sample analyzer 10 is shown that is configured to heat a diagnostic consumable holder 162 containing a biological sample and a reagent, and measure a characteristic of the heated biological sample. The biological sample analyzer 10 can be configured to accelerate heating of the consumable holder 162 by setting at least one heater of the analyzer to apply an elevated temperature that is above the target temperature of the biological sample. The biological sample analyzer 10 can include a housing 14 configured to house various components of the biological sample analyzer 10. The housing 14 can include at least one outer wall 18. The at least one outer wall has an outer surface, and an inner surface opposite the outer surface. The at least one outer wall 18, such as the inner surface of the at least one outer wall 18, defines an internal cavity 34 of the housing 14 that is configured to house various components for heating and measuring characteristics of the biological sample.

The housing 14 can have a first end 14a and a second end 14b that are spaced from one another along a first direction $D_1$. The housing 14 can have a first side 14c and a second side 14c that are spaced from one another along a second direction $D_2$, perpendicular to the first direction $D_1$. The housing 14 can define an upper end 14e and a lower end 14f that are spaced from one another along a third direction $D_3$, perpendicular to both the first and second directions $D_1$ and $D_2$. The internal cavity 34 can be defined between the first and second ends 14a and 14b, between the first and second sides 14c and 14d, and between the upper and lower ends 14e and 14f.

The at least one outer wall 18 can define a plurality of outer walls. For example, the at least one outer wall 18 can include a first wall 18a at the first end 14a. The at least one outer wall 18 can include a second end wall 18b at second end 14b. The at least one outer wall 18 can include a first sidewall 18c at the first side 14c. The at least one outer wall 18 can include a second sidewall 18d at the second side 14d. The at least one outer wall 18 can include an upper wall 18e at the upper end 14e. The at least one outer wall 18 can include a lower wall 18f at the lower end 14f. It will be understood that the housing 14 can have any suitable shape, including shapes other than that shown, that defines a cavity therein. Accordingly, the at least one outer wall 18 can include as few as a single wall (e.g., in the event that the housing 14 has a spherical shape) or more than one wall, and the walls can have a shape other than that shown.

The at least one outer wall 18 defines an opening 22 that extends therethrough. The opening 22 is open to the cavity 34 such that the opening 22 is configured to receive the consumable holder 162 162 into the cavity 34. The opening 22 can extend into the upper end 14e of the housing 14, such as into the upper wall 18e. However, it will be understood that, in alternative embodiments, the opening 22 can extend into one or more of the end 14a, end 14b, side 14c, side 14d, and end 14e.

The biological sample analyzer 10 can include a door 26 that is movably coupled to the housing 14. The door 26 can be configured to selectively cover the opening 22 so as to prevent heat from escaping the biological sample analyzer 10 through the opening 22. The door 26 is configured to be transitioned between an open position, where the housing 14 is configured to receive the consumable holder 162 through the opening 22, and a closed position, where the door 26 covers the opening 22. In the closed position, the door 26 both prevents a consumable holder 162 from being inserted into the biological sample analyzer 10 through the opening 22, and prevents a consumable holder 162 already disposed within the internal cavity 34 from being removed from the biological sample analyzer 10. The biological sample analyzer 10 can include a door sensor 30 configured to detect whether the door 26 is in the open position or the closed position. The door sensor 30 can be, for example, a relay switch or any other suitable sensor that can detect when a door is open or closed.

The door sensor 30 can be in signal communication with a controller 46. The controller 46, which can be a PID controller, can comprise any suitable computing device configured to host a software application for monitoring and controlling various operations of the biological sample analyzer 10 as described herein. It will be understood that the controller 46 can include any appropriate computing device, examples of which include a processor, a desktop computing device, a server computing device, or a portable computing device, such as a laptop, tablet, or smart phone. The controller 46 can be physically attached to the housing, disposed within the housing 14, or can be remote to and potentially spaced a distance from the housing 14.

The controller 46 can include a memory 50. The memory 50 can be volatile (such as some types of RAM), non-volatile (such as ROM, flash memory, etc.), or a combination thereof. The controller 46 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 46.

The controller 46 can optionally include a human-machine interface (HMI) device 54. The HMI device 54 can include inputs that provide the ability to control the controller 46, via, for example, buttons, soft keys, a mouse, voice actuated controls, a touch screen, movement of the controller 46, visual cues (e.g., moving a hand in front of a camera on the controller 46), or the like. The HMI device 54 can provide outputs, via a graphical user interface, including visual information concerning various components of the biological sample analyzer 10. Other outputs can include audio information (e.g., via speaker), mechanically (e.g., via a vibrating mechanism), or a combination thereof. In various configurations, the HMI device 54 can include a display, a touch screen, a keyboard, a mouse, a motion detector, a speaker, a microphone, a camera, or any combination thereof. The HMI device 54 can include any suitable device for inputting biometric information, such as, for example, fingerprint information, retinal information, voice information, and/or facial characteristic information, for instance, so as to require specific biometric information for accessing the controller 46.

The controller 46 can be in wired and/or wireless communication with the door sensor 30, as well as various other components of the biological sample analyzer 10, as will be described further below. The controller 46, and specifically the HMI device 54, can be configured to produce an alert if the door sensor 30 senses that the door 26 is in the open position for a predetermined amount of time. In one embodiment, the predetermined amount of time can be about 15 seconds. However, it is contemplated that the predetermined amount of time can be more or less than 15 seconds as desired. Optionally, the HMI device 54 can be configured to receive a user input such that an operator of the biological sample analyzer 10 can manually select and/or adjust the predetermined amount of time that the door 26 can be in the open position. When the door 26 is maintained in the open position for the predetermined amount of time after a consumable holder 162 is disposed within the housing 14, the controller 46 may invalidate the intended heating operation and produce a corresponding alert via the HMI device 54.

Referring to FIG. 2, the at least one outer wall 18 of the housing 14 can define an air intake 38 that extends through the at least one outer wall 18. The air intake 38 is configured to receive air from outside the housing 14 and into the internal cavity 34. The air intake 38 can be defined by at least one opening that extends through the at least one outer wall 18, such as a plurality of openings spaced about the at least one outer wall 18. The air intake 38 can extend through a first wall of the at least one of the outer wall 118. In FIG. 2, the air intake 38 is defined at the second end 18b, and in particular, is defined by the second end wall 18b. Further, the air intake 38 is oriented substantially along a plane that is parallel to the second and third directions $D_2$, $D_3$, e.g., a substantially vertically-oriented plane. However, it will be understood that the air intake 38 can be defined at any another side or end of the housing 14, and can be oriented along a different plane or multiple planes.

The at least one outer wall 18 of the housing 14 can define an air exhaust 42 that extends through the at least one outer wall 18. The air exhaust 42 is spaced from the air intake 38 about the at least one outer wall 18. The air exhaust 42 can extend through a second wall of the at least one of the outer wall 118. The second outer wall can be different from the first outer wall through which the air intake 38 extends. In some embodiments, the second outer wall can be angularly offset from the first outer wall. The air exhaust 42 is configured to expel air from the internal cavity 34 to an area outside of the housing 14. Like the air intake 38, the air exhaust 42 can be defined by at least one opening that extends through the at least one outer wall 18, such as a plurality of openings spaced about the at least one outer wall 18. In FIG. 2, the air exhaust 42 is defined at the lower end 18f of the housing 14, and in particular, is defined by the lower end wall 18f. Further, the air exhaust 42 is oriented substantially along a plane that is parallel to the first and second directions $D_1$, $D_2$, e.g., a substantially horizontally-oriented plane. As a result, the air intake 38 can be angularly offset from the air exhaust 42. In the depicted embodiment, the air intake 38 is angularly offset from the air exhaust 42 by about 90 degrees. However, the air intake 38 and the air exhaust 42 can be alternatively oriented relative to each other as desired. It will be understood that the air exhaust 42 can be defined at any another side or end of the housing 14, and can be oriented along a different plane or multiple planes.

The air intake 38 can be configured to provide received air into the internal cavity 34 along an intake direction $D_I$. The air exhaust 42 can be configured to receive air from the cavity 34 along an exhaust direction $D_E$, and to expel the air out of the cavity 34. The intake direction $D_I$ can be angularly offset from the exhaust direction $D_E$. In one example, the intake direction $D_I$ can be substantially perpendicular to the exhaust direction $D_E$. In alternative embodiments, the intake direction $D_I$ and exhaust direction $D_E$ can be substantially parallel to one another. In some embodiments, the air intake 38 can receive the air along the intake direction $D_I$. Additionally or alternatively, in some embodiments, the air exhaust 42 can expel air along the exhaust direction $D_E$. However, it will be understood that in alternative embodiments, at least one of the air intake 38 and air exhaust 42 can include louvers that changes the trajectory of the air as it is received into the air intake 38 or expelled from the air exhaust 42.

Figure 3:
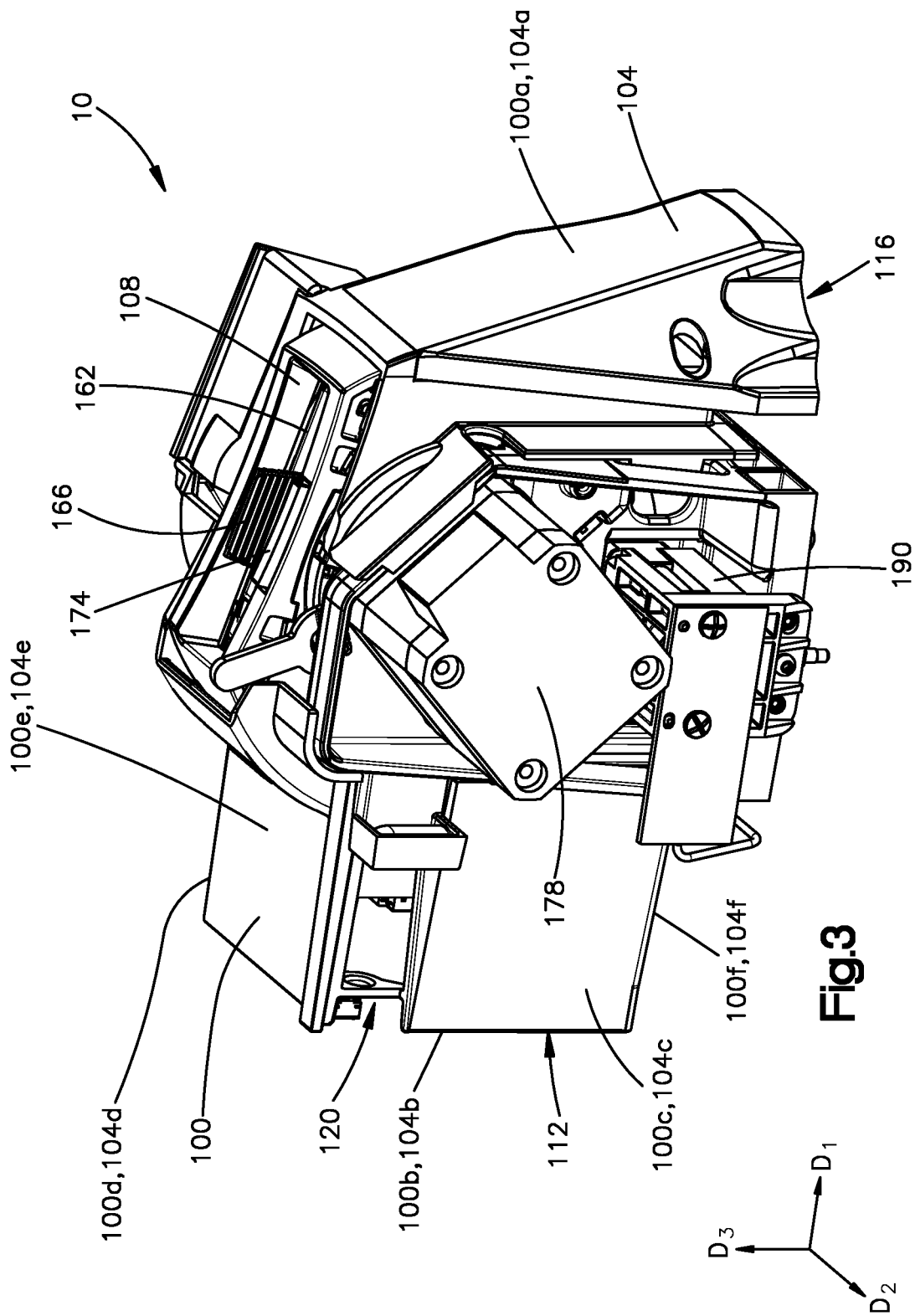
FIG. 3 shows a perspective view of interior components of the biological sample analyzer of FIG. 1, including an air plenum, a motor, a diagnostic consumable holder, and a receptacle for the diagnostic consumable holder.

Turning to FIG. 3, the biological sample analyzer 10 includes a plenum 100 disposed within the internal cavity 34 of the housing 14. The plenum 100 can include at least one plenum wall 104 that has an inner plenum surface, and an outer plenum surface opposite the inner surface. The at least one plenum wall 104, such as the inner surface of the at least one plenum wall 104, defines an air duct 120 therein. The plenum 100 can have a first plenum end 100a and a second plenum end 100b that are spaced from one another along a first direction $D_1$. The plenum 100 can have a first plenum side 100c and a second plenum side 100c that are spaced from one another along the second direction $D_2$. The plenum 100 can define an upper plenum end 100e and a lower plenum end 100f that are spaced from one another along the third direction $D_3$. The air duct 120 can be defined between the first and second plenum ends 100a and 100b, between the first and second plenum sides 100c and 100d, and between the upper and lower plenum ends 100e and 100f.

The at least one plenum wall 104 can include a plurality of plenum walls. For example, the at least one plenum wall 104 can include a first plenum end wall 104a at the first plenum end 100a. The at least one plenum wall 104 can include a second plenum end wall 104b at the second plenum end 100b. The at least one plenum wall 104 can include a first plenum sidewall 104c at the first plenum side 100c. The at least one plenum wall 104 can include a fourth plenum wall 104d at the second plenum side 100d. The at least one plenum wall 104 can include an upper plenum wall 110e at the upper plenum end 100e. The at least one plenum wall 100 can include a lower plenum wall 104f at the lower plenum end 100f. It will be understood that the plenum 100 can have any suitable shape, including shapes other than that shown. Accordingly, the at least one outer plenum wall 104 can include as few as a single wall or more than one wall, and the walls can have a shape other than that shown.

The at least one plenum wall 104 can define an opening 108 that extends therethrough. The opening 108 is open to the air duct 120 such that the opening 108 is configured to receive the consumable holder 162 into the air duct 120. The opening 108 is aligned below the opening 22 of the housing 14 such that a straight path is defined from the opening 22 of housing 14 into the air duct 120 through the opening 108. The opening 108 can extend into the upper end 100e of the plenum 100, such as into the upper plenum wall 104e. However, it will be understood that, in alternative embodiments, the opening 108 can extend into one or more of the end 100a, end 100b, side 100c, side 100d, and end 100e.

The plenum 100 defines a plenum intake 112 that extends through the at least one plenum wall 104. The plenum intake 112 is configured to receive air from the air intake 38 of the housing 14 into the plenum 100. The plenum intake 112 is disposed adjacent to, and is in fluid communication with, the air intake 38 such that air received at the air intake 38 is received into the plenum intake 112. The plenum intake 112 can be defined by at least one opening, or a plurality of openings spaced about the at least one plenum wall 104. In FIG. 3, the plenum intake 112 is defined at the second plenum end 100b, and in particular, is defined by the second plenum end wall 104b. Further, the plenum intake 112 is oriented substantially along a plane that is parallel to the second and third direction $D_2$, $D_3$, e.g., a substantially vertically-oriented plane. However, it will be understood that the plenum intake 112 can be defined at any another side or end of the plenum 100, and can be oriented along a different plane or multiple planes.

The plenum 100 defines a plenum exhaust 116 that extends through the at least one plenum wall 104. The plenum exhaust 116 is spaced from the plenum intake 112 about the at least one plenum wall 104 such that the air duct 120 extends from the plenum exhaust 116 to the plenum intake 112. The plenum exhaust 116 is configured to expel air from the plenum 100. The plenum exhaust 116 is disposed adjacent to, and is in fluid communication with, the air exhaust 42 such that air expelled from the plenum exhaust 116 is expelled out of the air exhaust 42. Like the plenum intake 112, the plenum exhaust 116 can be defined by at least one opening, or a plurality of openings spaced about the plenum wall 104. In FIG. 3, the plenum exhaust 116 is defined at the lower plenum end 100f, and in particular, is defined by the lower plenum end wall 104f. Further, the plenum exhaust 116 is oriented substantially along a plane that is parallel to the first and second directions $D_1$, $D_2$, e.g., a substantially horizontally-oriented plane. As a result, the plenum intake 112 can be angularly offset from the plenum exhaust 116. In the depicted embodiment, the plenum intake 112 is angularly offset from the plenum exhaust 116 by 90 degrees. However, the plenum intake 112 and the plenum exhaust 116 can be angularly offset from one another by any other suitable angle. In alternative embodiments, the plenum exhaust 112 and the plenum intake 116 can be parallel to one another. It will be understood that the plenum exhaust 116 can be defined at any another side or end of the plenum 100, and can be oriented along a different plane or multiple planes.

The plenum intake 112 can be configured to receive air into the air duct 120 along the intake direction $D_I$. The plenum exhaust 116 can be configured to expel air along the exhaust direction $D_E$. As described above, the intake direction $D_I$ can be angularly offset from the exhaust direction $D_E$. In one example, the intake direction $D_I$ can be substantially perpendicular to the exhaust direction $D_E$. In alternative embodiments, the intake direction $D_I$ and exhaust direction $D_E$ can be substantially parallel to one another. In operation, the biological sample analyzer 10 is configured to receive air through the air intake 38 of the housing 14, through the plenum intake 112, through the air duct 120, out of the air duct 120 through the plenum exhaust 116, and out of the housing 14 through the air exhaust 42.

Figure 4:
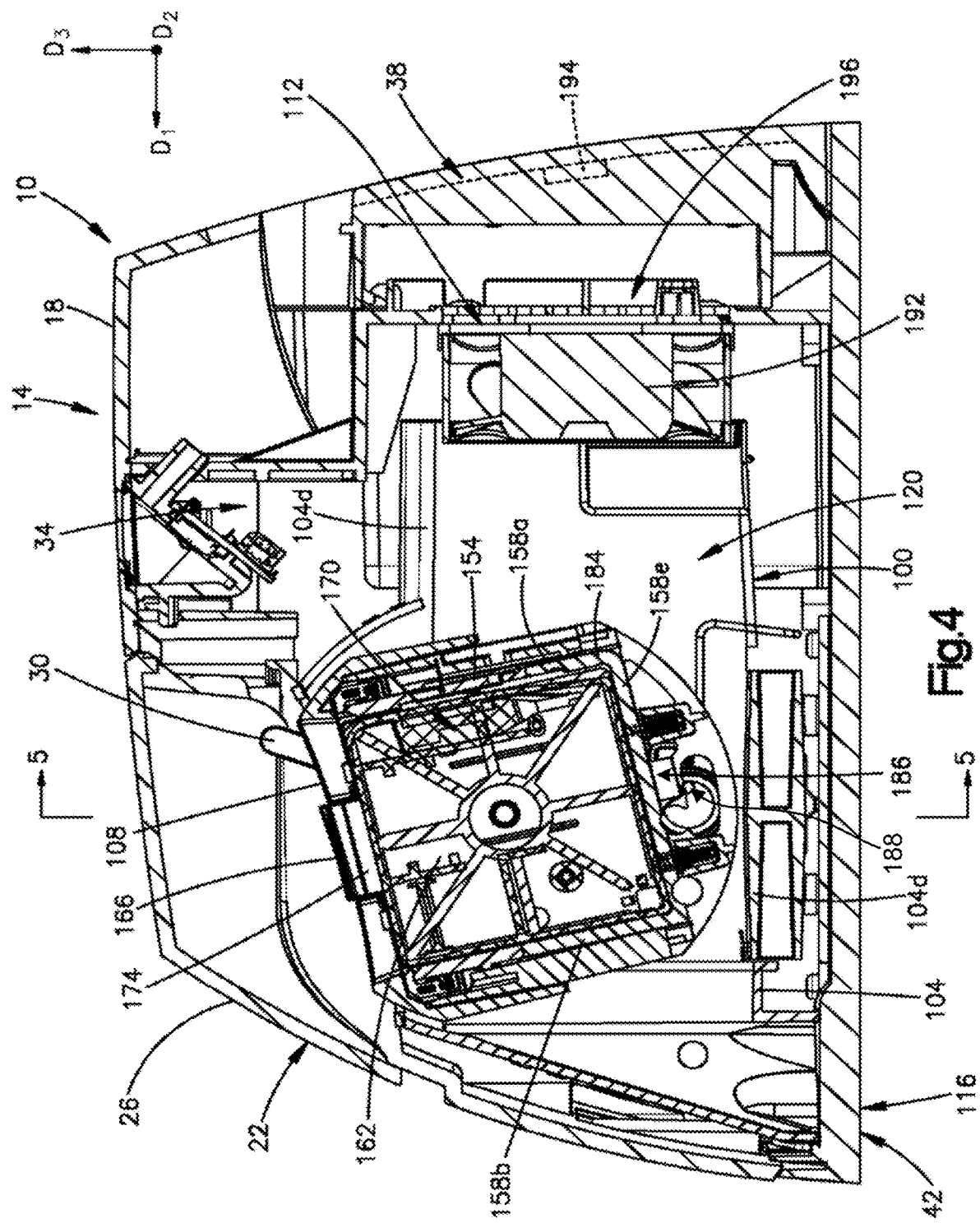
FIG. 4 shows a cross-sectional view of the biological sample analyzer of FIG. 1, taken along a center line that extends from the front to the back of the biological sample analyzer in FIG. 1.

Now referring to FIGS. 4, 7, and 8, the biological sample analyzer 10 comprises a receptacle 154 that is configured to support the consumable holder 162 containing the biological sample. At least a portion of the receptacle 154 is disposed within the plenum 100. The receptacle 154 can have an open end configured to receive and hold the consumable holder 162 during a heating and measuring operation. The receptacle can have a substantially rectangular shape; however, the shape of the receptacle 154 can vary depending on the shape of the consumable holder to be received.

In the depicted embodiment, the receptacle 154 has a first holder end 158a, and a second holder end 158b opposite the first holder end 158a along the first direction $D_1$. The receptacle 154 has a first holder side 158c that extends from the first holder end 158a to the second holder end 158b, as well as a second holder side 158d that is opposite the first holder side 158c and extends from the first holder end 158a to the second holder end 158b. The first and second holder sides 158c and 158d can be considered to be first and second heater plates, although the sides 158c and 158d can have suitable configurations other than plates, such as coils, for heating the consumable holder 162. The receptacle 154 can also include a bottom holder end 158e that defines the lower end of the receptacle 154 and extends between each of the first and second holder ends 158a and 158b and between the first and second holder sides 158c and 158d. The receptacle 154 can define a receiving area 170 configured to receive the consumable holder 162 in order to heat the consumable holder 162, where the receiving area 170 is defined between each of the first and second holder ends 158a and 158b, between the first and second holder sides 158c and 158d, and above the bottom holder end 158e. The dimensions and shape of the receiving area 170 can vary depending on the type and shape of consumable holder to be disposed within the receiving area 170, though in the depicted embodiment the receiving area 170 has a substantially rectangular profile in a plane that extends along the first and second directions $D_1$ and $D_2$. The receptacle 154 can be formed from a thermally conductive material such as aluminum, an aluminum alloy, copper, or any other suitable thermally conductive material. A sensor 174 (shown in FIGS. 4 and 6) can be disposed within the receptacle 154 and can be configured to detect whether a consumable holder 162 has been inserted into the receptacle 154. The cartridge sensor 174 can be a relay switch or any other suitable sensor that can detect the presence of a consumable holder. The cartridge sensor 174 can be in signal communication with the controller 46 so as to communicate whether a consumable holder 162 has been inserted into the receptacle 154 to the controller 46.

Figure 5:
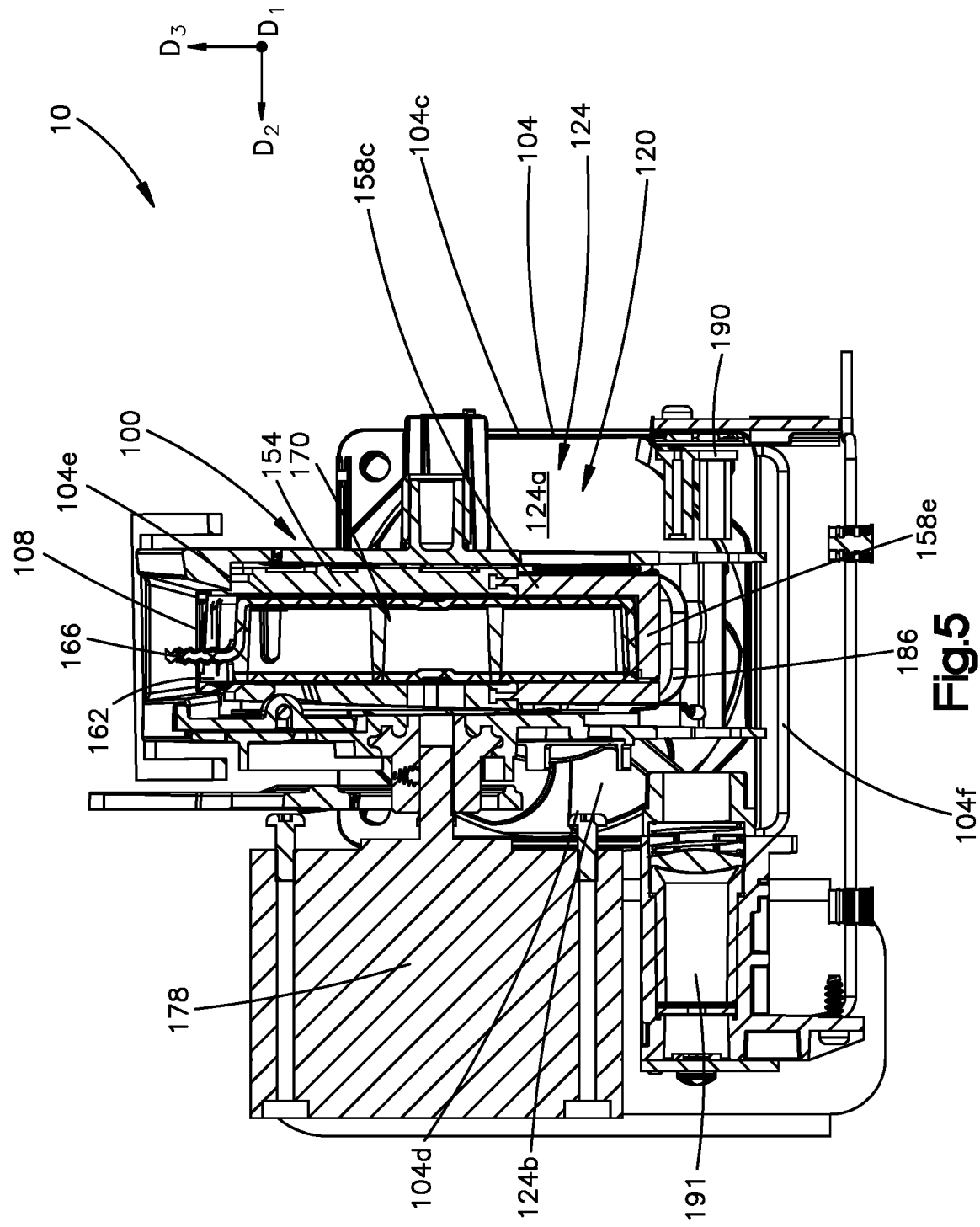
FIG. 5 shows a cross-sectional view of the biological sample analyzer of FIG. 1, taken along line 5-5 shown in FIG. 4 and with the housing removed.

Turning to FIG. 5, the biological sample analyzer 10 can support at least a portion of the receptacle 154 within the air duct 120 of the plenum 100 such that at least one air gap 124 is defined between the receptacle 154 and the at least one plenum wall 104. This air gap 124, which comprises a portion of the air duct 120, allows air to flow along the receptacle 154 in order to cool the receptacle 154. The air gap 124 can be defined between the at least one plenum wall 104 and any combination of the sides 158a-158e of the receptacle 154. For example, the air gap 124 can include a first air gap 124a defined between the first holder side 158c of the receptacle 154 and the first plenum sidewall 104c. The air gap 124 can additionally or alternatively include a second air gap 124b defined between the second holder side 158d of the receptacle 154 and the second plenum sidewall 104d. The air gap 124 can additionally or alternatively be defined between the bottom holder end 158e and the lower plenum wall 104f.

Figure 6:
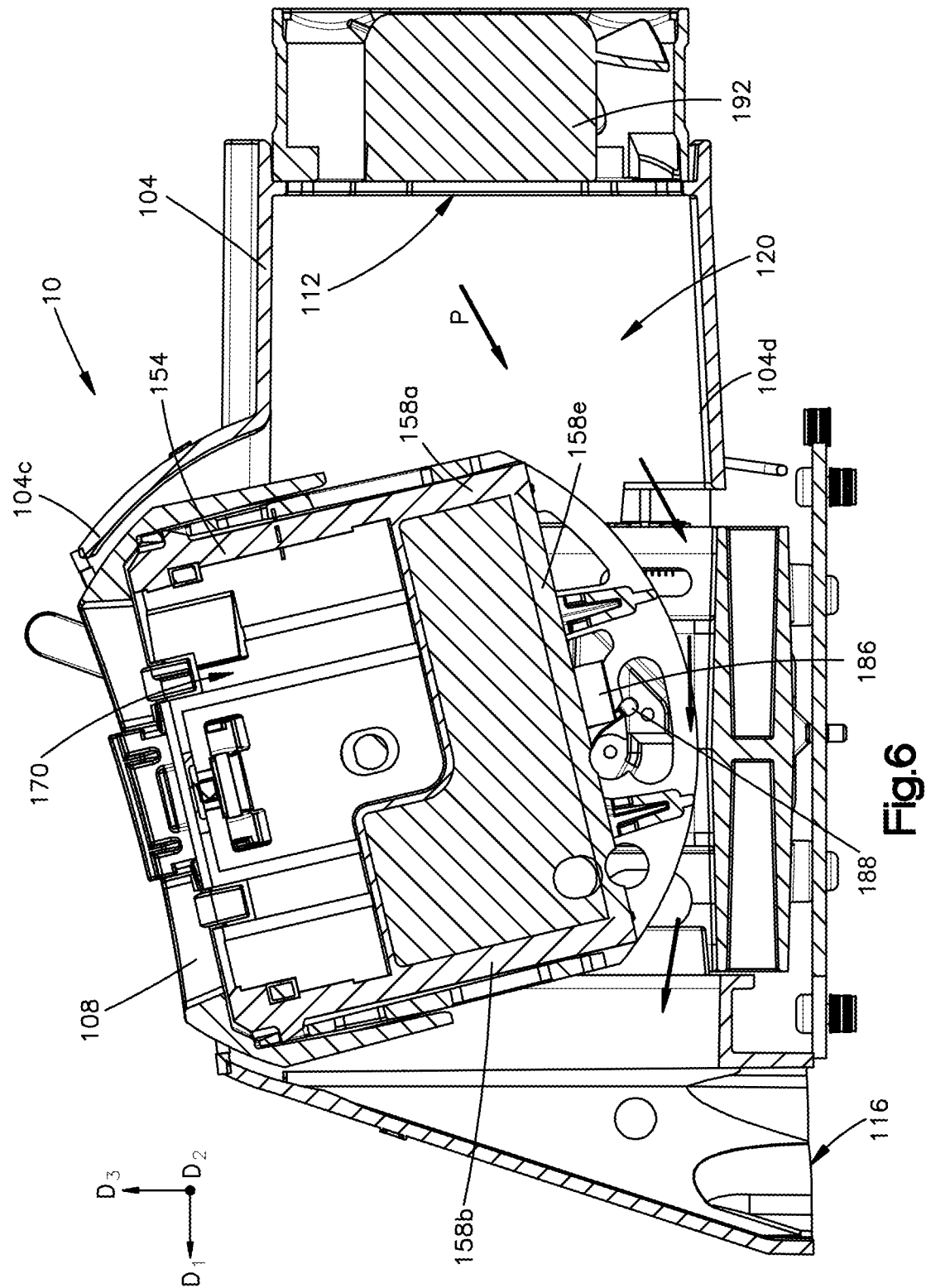
FIG. 6 shows the cross-sectional view of the biological sample analyzer of FIG. 4 with the housing removed.

Referring to FIG. 6, to force air through the air duct 120, the biological sample analyzer 10 can include a fan 192 configured to force air along a path P that extends from the air intake 38 of the housing 14, through the plenum intake 112 of the plenum 100, through an air gap 124, through the plenum exhaust 116, and out the air exhaust 42 of the housing 14. Specifically, the fan 192 can direct air through the at least one air gap 124, such as through at least one of the first air gap 124a and the second air gap 124b along the first and second lateral sides 158c and 158d of the receptacle 154. The fan 192 optionally also direct air through the portion of the air gap 124 defined below the receptacle 154 between the bottom side 158e and the plenum wall 104. In the depicted embodiment, the fan 192 is positioned at the plenum intake 112 of the plenum 100, although alternative positioning of the fan 192 is contemplated. For example, the fan 192 could alternatively be positioned as the plenum exhaust 116. The fan 192 can be in wired and/or wireless communication with the controller 46, such that the controller 46 can direct operation of fan 192. As a result, the fan 192 can be selectively transitioned between different speeds at predetermined intervals in a heating operation, as will be described further below.

Referring back to FIG. 4, the biological sample analyzer 10 can also include a temperature sensor 194 positioned adjacent the fan 192, where the temperature sensor 194 is configured to detect the ambient temperature of the air being drawn into the plenum 100 by the fan 192. The temperature sensor 194 can be in wired and/or wireless communication with the controller 46 such that the controller 46 can monitor the air temperature sensed by the temperature sensor 194. The temperature of the air forced into the plenum 100 can be representative of the ambient temperature that exists outside the biological sample analyzer 10, which can be useful in calculations related to the heating operation of the consumable holder 162, as will be discussed further below. In some embodiments, the analyzer 10 can include another temperature sensor (not shown) on the main printed circuit board (PCB) within the air flow to ensure that air temperature sensed by the sensor 194 is not in skewed due to heat output from the at least one heater of the analyzer.

The biological sample analyzer 10 can also include a filter 196 (see FIG. 4) positioned upstream from the fan 192, where the filter 196 is configured to filter out particulates from the air drawn into the plenum 100 by the fan 192. Over time, the filter 196 can become increasingly clogged, and the filter 196 can become clogged to a sufficient degree that the airflow provided to the fan 192 becomes limited. This reduced airflow can negatively affect the cooling of the receptacle 154, as less air is available for the fan 192 to force over the receptacle 154. Obstruction of the filter 196 can be determined by comparing the instantaneous power consumed by the heater 186 to a baseline power consumption. Power consumption by the heater 186 that is lower than expected can be indicative of a clogged filter 196. The controller 46 can then use this information to adjust the speed of the fan 192, as will be described further below.

Returning to FIGS. 7 and 8, the biological sample analyzer 10 can further include at least one heater 186 for heating the receptacle 154. The at least one heater 186 can apply heat directly or indirectly to the receptacle 154 so as to heat the receptacle 154. The receptacle 154, in turn, can apply heat to the consumable holder 162 when the consumable holder 162 is disposed within the receiving area 170 of the receptacle 154. The at least one heater 186 can be attached to the outer surface of the receptacle 154. For example, the at least one heater 186 can be attached to the outer surfaces of any of the first and second holder ends 158a and 158b, the first and second holder sides 158c and 158d, and the bottom holder end 158e. The at least one heater 186 can comprise an electrically conductive coil supported by a flexible or rigid printed circuit board (PCB), such as a polyimide flexible heater, or any other suitable heater that can heat the receptacle 154. The at least one heater 186 can include a first heater 186a attached to the first holder side 158c of the receptacle 154, and a second heater 186b, opposite the first heater 186a, and attached to the second holder side 158d of the receptacle 154. However, the heater 186 can include more or less than two heaters as desired. The at least one heater 186, including the first and second heaters 186a and 186b, can be in wired and/or wireless signal communication with the controller 46 such that the controller 46 can control and adjust the heating profile of the first and second heaters 186a and 186b as will be discussed further below.

The biological sample analyzer 10 can include at least one heater sensor 188 configured to detect a temperature of the receptacle 154. The at least one heater sensor 188 can include first and second heater sensors 188a and 188b attached to the receptacle 154, where each of the first and second heater sensors 188a and 188b can be configured to detect an instantaneous temperature of the receptacle 154 at a different location. The first heater sensor 188a can be attached to the first holder side 158c of the receptacle 154 adjacent to the first heater 186a, and thus, can be configured to detect the temperature of the receptacle 154 at a location adjacent the first heater 186a. Likewise, the second heater sensor 188b can be attached to the second lateral side 158d of the receptacle 154 adjacent the second heater 186b, and can thus be configured to detect the temperature of the receptacle 154 at a location adjacent the second heater 186b. Each of the first and second heater sensors 188a and 188b can comprise any suitable temperature sensor such as a thermistor. Though two heater sensors are specifically described, the biological sample analyzer 10 can include more or less than two heater sensors as desired.

The temperature of the biological assay, which is disposed in the consumable holder 162, cannot be measured directly. Instead, the temperature of the assay can be controlled indirectly based on a temperature of the receptacle 154. Therefore, the biological sample analyzer 10 can comprise a feedback loop that is configured to control heat applied to the receptacle 154. The feedback loop can be continuously updated at predetermined intervals (e.g., every second). The feedback loop comprises the controller 46, the at least one heater 186, and the at least one heater sensor 188. The at least one heater sensor 188 can be configured to provide a detected (i.e., measured) temperature of the receptacle 154 to the controller 46. The controller 46 can be configured to determine a temperature error based on the detected temperature and a desired temperature. The controller 46 can then control an amount of heat provided by the at least one heater 186 based on the temperature error so as to drive the temperature error towards zero error. As will be described below, the desired temperature can be the target temperature, the elevated temperature, or a set point temperature. In one example, the temperature error can be determined as a difference between the desired temperature and the detected temperature. In another example, the temperature error can be determined based on a ratio of the desired temperature and the detected temperature In some such cases, a value of one can be subtracted from the ratio.

Referring to FIGS. 3 and 5, a biological analysis sensor 190 can be disposed within the housing 14, where the sensor 190 is configured to measure a characteristic of the biological sample disposed within the consumable holder 162. In one embodiment, the sensor 190 is an optical sensor, such as a photodiode, though other types of sensors are contemplated. The analyzer 10 can include a light source 191 that is configured to emit a light beam through the consumable holder 162, and hence through the biological sample, to the sensor 190. The sensor 190 can be configured to detect at least one of an HbA1C level of the biological sample, a ratio of albumin to creatinine, a hemoglobin level, an agglutination measurement, or any other desired biological characteristic. When the consumable holder 162 is inserted into the receptacle 154, the biological sample contained within the consumable holder 162 may require mixing with the reagent prior to the sensor 190 measuring the characteristic of the biological sample. To accomplish this, the biological sample analyzer 10 can include a motor 178 mounted within the housing 14. The motor 178 can be configured to move the receptacle 154 within the plenum 100 so as to agitate the biological sample within the consumable holder 162. The motor 178 can include a shaft 182 that extends through the plenum 100 from the motor 178, and operatively connects to the receptacle 154 opposite the motor 178. This allows the motor 178 to be disposed within the housing 14 outside the plenum 100. The motor 178 can be configured to vibrate, rotate, or otherwise agitate the receptacle 154 through the shaft 182.

The plenum 100 can be specifically designed so as to allow the movement of the receptacle 154 within the plenum 100 so as to mix the biological sample within the consumable holder 162. For example, the upper portion of the at least one plenum wall 104 can be curved so as to provide a clearance between the plenum 100 and the receptacle 154 and thus allow free movement and/or rotation of the receptacle 154 relative to the plenum 100. The rest of the plenum wall 104, including the first and second plenum walls 104a and 104b, can also be spaced from the receptacle 154 sufficiently to accommodate this movement. This design for the plenum wall 104 can also allow for the plenum 100 to guide air through the air gap 124 along the receptacle 154. By defining the air gap 124 along each side of the receptacle 154, the plenum 100 provides a surface area on the receptacle 154 over which air may conduct heat from the receptacle 154.

Now referring to FIGS. 9 and 12, a method 200 of operating a biological sample analyzer will be described. The method 200 can begin at step 202, which corresponds to a startup of the at least one heater 186 of the biological sample analyzer 10. Upon startup, the controller 46 controls the heater 186 to heat the receptacle 154 to an elevated temperature ET. As shown in FIG. 12, the receptacle 154 may be at an ambient temperature AT at an initial time $t_0$. In step 202, the heater 186 heats the receptacle 154 from the ambient temperature AT at the initial time $t_0$ to the elevated temperature ET at the first time $t_1$. In so doing, the controller 46 can determine the elevated temperature ET based on the ambient temperature AT and the target temperature TT. The elevated temperature ET can be stored in the memory 50, and the controller 46 can look up the elevated temperature ET from predetermined value or values of the elevated temperature ET that are stored in the memory 50 based on the ambient and target temperatures AT and TT. Alternatively, the controller 46 can calculate the elevated temperature ET. The elevated temperature ET for a particular heating operation can be determined according to Equation (1):

$$ET = TT + \frac{TT - AT}{SF} \quad (1)$$

where:
 ET=Elevated Temperature
 TT=Target Temperature
 AT=Ambient Temperature
 SF=Initial Slope Factor In Equation (1), the target temperature TT represents the temperature to which the biological sample within the consumable holder 162 is to be heated for the particular characteristic of the biological sample to be measured. As such, the target temperature TT will vary based on the particular characteristic to be measured. For example, for HbA1c levels, the target temperature TT can be 34° Celsius with a standard deviation of +/−0.4° Celsius when the characteristic to be measured is Hemoglobin. For HbA1c levels, the target temperature TT can be 34° Celsius with a standard deviation of +/−0.2° Celsius when the characteristic to be measured is agglutination. The target temperature TT can be 36° Celsius with a standard deviation of +/−0.4° Celsius when the characteristic to be measured is a ratio of albumin to creatinine. However, other target temperatures are contemplated. The elevated temperature ET may be in a range from greater than TT to about 50° Celsius, though elevated temperatures outside this range are also contemplated. The ambient temperature AT represents the temperature of the ambient environment outside the biological sample analyzer 10 as measured by the temperature sensor 194 adjacent the fan 192, as previously described. The ambient temperature AT in which the biological sample analyzer 10 can be in a range from about 15° Celsius to about 32° Celsius, though other ambient temperatures are contemplated. The initial slope factor is a constant that adjusts for the amount of energy needed to apply to the system. If the amount of time that the elevated temperature ET is applied is increased, then the slope factor is increased. The calculations can assume that the consumable holder 162 and heater plates have a fixed mass. Thus, the slope factor can be selected to ensure that the total area under the curve (i.e., the total energy) remains substantially the same from the analysis of one biological sample to the next.

During step 202, the feedback loop can be employed to raise the receptacle 154 to the elevated temperature ET (from time $t_0$ to time $t_1$), and then subsequently maintain the receptacle 154 at the elevated temperature ET (from time $t_1$ to time $t_2$). The feedback loop can be continuously updated as described above to control the heat applied by the at least one heater 186 to the receptacle 154. In this case, the elevated temperature ET is used as the desired temperature to determine the temperature error.

Step 202 can be performed before the consumable holder 162 is inserted into the receptacle 154 to shorten the amount of time required to bring the consumable holder 162 up to the target temperature TT once the consumable holder 162 is disposed within the receptacle 154. In step 206, the consumable holder 162 can be inserted into the receptacle 154. Preferably, the consumable holder 162 is inserted at insertion time $t_i$ between time $t_1$ and time $t_2$ as shown in FIG. 12. The cartridge sensor 174 can detect the insertion of the consumable holder 162 into the receptacle 154 in step 206, and can communicate to the controller 46 that a consumable holder 162 has been inserted. During steps 202 and 206, the controller 46 can operate the fan 192 at a first speed as will be discussed further below. The first speed can be zero or can be a relatively low speed, and thus, the fan can be off or can be moving slowly when at the first speed.

In step 210, the controller 46 can determine whether the door 26 of the housing 14 remains open for a predetermined period. If the door 26 remains open for a certain amount of time after the consumable holder 162 is inserted into the receptacle 154, then an unknown amount of heat can escape the biological sample analyzer 10 through the opening 22. As result, the controller may have difficulty in determining how much heat is needed to bring the receptacle 154 to the target temperature TT. In one embodiment, the predetermined period of time can be about 15 seconds, though the period of time can vary. Further, a predetermined period of time can be manually chosen by an operator of the biological sample analyzer by providing an input to the HMI device 54. If the door 26 is open for more than the predetermined period of time, in step 214 the HMI device 54 can produce an alert to inform the operator that the analysis has faulted. Further, the controller 46 can invalidate the current heating operation. If the door 26 is not open for the predetermined period of time, then the door sensor 30 can continue to monitor whether the door 26 is in the open or closed position throughout the entirety of the method 200.

When an unheated consumable holder 162 is inserted into the receptacle 154 in step 206, the lower temperature of the consumable holder 162 in relation to the receptacle 154 (which has been heated to the elevated temperature ET) can cause the temperature of the receptacle 154 to drop measurably. This temperature drop will cause an increase in the temperature error. After insertion, the feedback loop can be continuously updated as described above to heat the receptacle 154 at the elevated temperature ET (from time $t_1$ to time $t_2$) and drive the temperature error to zero. In this case, the desired temperature that is used to determine the temperature error is the elevated temperature ET. In at least some embodiments, the at least one heater 186 can increase the heating at a controlled rate that can be repeatable from one consumable holder to the next.

In step 218, the controller 46 can direct the heater 186 to maintain the receptacle 154 at the elevated temperature ET for a first period of time that extends from the insertion time $t_i$ to a second time $t_2$ as shown in FIG. 12. During step 218, the feedback loop can be continuously updated to maintain the receptacle 154 at the elevated temperature ET (from time $t_1$ to time $t_2$). Further, the fan 192 can be operated at the first speed, which is off or relatively low. Maintaining the receptacle 154 at the elevated temperature ET for the first period of time while the consumable holder 162 is disposed within the receptacle 154 aids in bringing the biological sample disposed within the consumable holder 162 up to the target temperature TT at a quicker rate than in conventional heaters. The first period of time FP can be a predetermined time stored in the memory 50, and the controller 46 can look up the first period of time FP from predetermined value or values of the first period of time FP that are stored in the memory 50. Alternatively, the first period of time FP can be entered by the operator into the HMI device 54. Alternatively still, the controller 46 can calculate the first period of time FP. The first period of time FP can be determined according to Equation (2) as follows:

$$FP=(DTB+AT)*SDM \tag{2}$$

where:
    FP=First Period of Time
    DTB=Decay Time Base
    AT=Ambient Temperature
    SDM=Start Decay Multiplier The decay time base DTB is an offset coefficient that is used to determine the first period of time FP. In some examples, DTB can be about 475. In some embodiments, the first period of time can be fixed when the consumable holder 162 is not determined to be cold as discussed below. The start decay multiplier SDM is a coefficient that is used to reduce the length of time that the consumable holder 162 is heated at the elevated temperature ET. In some embodiments, the Start Decay Multiplier SDM can be about 0.05. This ensures that heating at the elevated temperature ET is stopped before the consumable holder 162 reaches the target temperature. The ambient temperature AT represents the temperature of the environment external to the biological sample analyzer, which is determined by measuring the temperature of air entering the plenum 100 using the temperature sensor 194. In Equation (2), the first period of time FP is determined based on the ambient temperature AT. Thus, the controller 46 assumes that the consumable holder 162 is at the ambient temperature AT when determining the first period of time FP. However, this might not always be the case as an operator can insert a cold consumable holder into the receptacle 154. Therefore, the biological sample analyzer 10 can be configured to detect a cold consumable holder as described in further detail below.

In step 222, the controller 46 can control the biological sample analyzer 10 to perform a temperature decay at the end of the first period of time FP, wherein the temperature of the receptacle 154 is reduced from the elevated temperature ET to the target temperature TT. In particular, the controller 46 can direct the at least one heater 186 to reduce the amount of heat applied to the consumable holder 162 before the consumable holder 162 exceeds the target temperature TT. In addition, the controller 46 can also operate the fan 192 at a second speed, faster than the first speed, to aid in reducing the amount of heat applied to the consumable holder 162. In one embodiment, the controller 46 can direct the heater 186 to reduce its temperature from the elevated temperature ET to the target temperature TT over a second period of time that extends from the second time $t_2$ to the third time $t_3$ as shown in FIG. 12. As a result, the temperature of the receptacle 154 will decrease from the elevated temperature ET to the target temperature TT. As shown in FIG. 12, the pattern of temperature decrease from the elevated temperature ET to the target temperature TT can be linear, though other patterns of decreasing the temperature are contemplated. The temperature setpoint of the heater 186 from the second period of time to the third period of time $t_3$ can be calculated according to Equation (3) below:

$$SP = ISP - \frac{ISP - FSP - ID}{T_{PID} - T_{SD}} \quad (3)$$

where:
SP=Instantaneous Temperature Setpoint
ISP=Initial Temperature Setpoint
FSP=Final Temperature Setpoint
ID=Initial Temperature Drop
$T_{PID}$=PID Time
$T_{SD}$=Time to Start Decay The initial temperature setpoint ISP is the temperature at time $t_2$ (e.g., the elevated temperature ET). The final temperature setpoint is the temperature at time $t_3$ (e.g., the target temperature TT). The initial temperature drop ID is an initial drop from the initial temperature setpoint to allow the decay to move quicker. In one example, this value can be set to about a half a degree. The $P_{ID}$ time is the time as it is kept by the controller 46. The time to start decay $T_{SD}$ is the time that the temperature decay starts in step 222. By reducing the temperature of the heater 186, and thus the receptacle 154, from the elevated temperature ET to the target temperature TT before the consumable holder 162 and the biological sample contained therein are raised to the target temperature TT, the biological sample analyzer 10 can ensure that the temperature of the consumable holder 162 can quickly increase to, but not overshoot, the target temperature TT.

In step 226, after the temperature of the receptacle 154 is reduced to the target temperature TT and the consumable holder 162 is raised to the target temperature TT, the controller 46 can direct the heater 186 to maintain the receptacle 154 at the target temperature TT. This is shown in FIG. 12 as occurring from the third time $t_3$ to the fourth time $t_4$. In addition, the controller 46 can operate the fan 192 at the first speed, or another speed lower than the second speed, so as to limit further cooling of the receptacle 154. Maintaining the receptacle 154 at the target temperature TT allows the consumable holder 162, and the biological sample contained therein, to remain at the target temperature TT throughout the process of measuring the characteristic of the biological sample.

In step 230, the controller 46 directs the motor 178 to actively mix the contents of the consumable holder 162. In so doing, the motor 178 can rotate the shaft 182 so as to rotate, vibrate, or otherwise move the receptacle 154, which transfers the motion to the consumable holder 162 contained within the receiving area 170. Step 230 can be performed concurrently with step 222 (i.e., between the second and third times $t_2$ and $t_3$ in FIG. 12). Alternatively, step 230 can be performed while the heater 186 maintains the receptacle 154 at the target temperature TT (i.e., concurrently with step 226 between the third and fourth times $t_3$ and $t_4$ in FIG. 12), or concurrently with steps 222 and 226.

Once the biological sample has been sufficiently mixed for a particular measuring operation and enough time has passed for the consumable holder 162 to stabilize at the target temperature, the sensor 190 can measure the characteristic of the biological sample in step 234. As previously stated, the characteristic can be, for example, an HbA1C level of the biological sample, a ratio of albumin to creatinine in the biological sample, or other suitable characteristic. Once measured, the measured characteristic can be transmitted to the controller 46 from the sensor 190. Referring to the graph in FIG. 12, step 234 can be performed after the third time $t_3$ and before the fourth time $t_4$, while the receptacle 154 is maintained at the target temperature TT.

Once the characteristic of the biological sample has been measured, an operator can remove the consumable holder 162 from the biological sample analyzer 10 in step 238. To achieve this, the operator can open the door 26 of the housing 14 and manually remove the consumable holder 162 from the receiving area 170 by grasping the handle 166 connected to the consumable holder 162. Once the consumable holder 162 has been removed from the receiving area 170, step 242 can be performed, in which the controller 46 directs the heater 186 to heat the receptacle 154 from the target temperature TT back to the elevated temperature ET. This step is performed so as to preheat the receiving area 170 in preparation for another consumable holder 162 being inserted into the receptacle 154. As shown in FIG. 12, step 242 begins at the fourth time $t_4$, and continues until the fifth time $t_5$, is which is the time at which the receptacle 154 again reaches the elevated temperature. This allows for a minimal delay between the end of one heating and measuring operation for one consumable holder 162 and the beginning of a subsequent heating and measuring operation for another consumable holder 162. In one embodiment, this delay can be less than or equal to 20 seconds, though other delays are contemplated.

Figure 9:
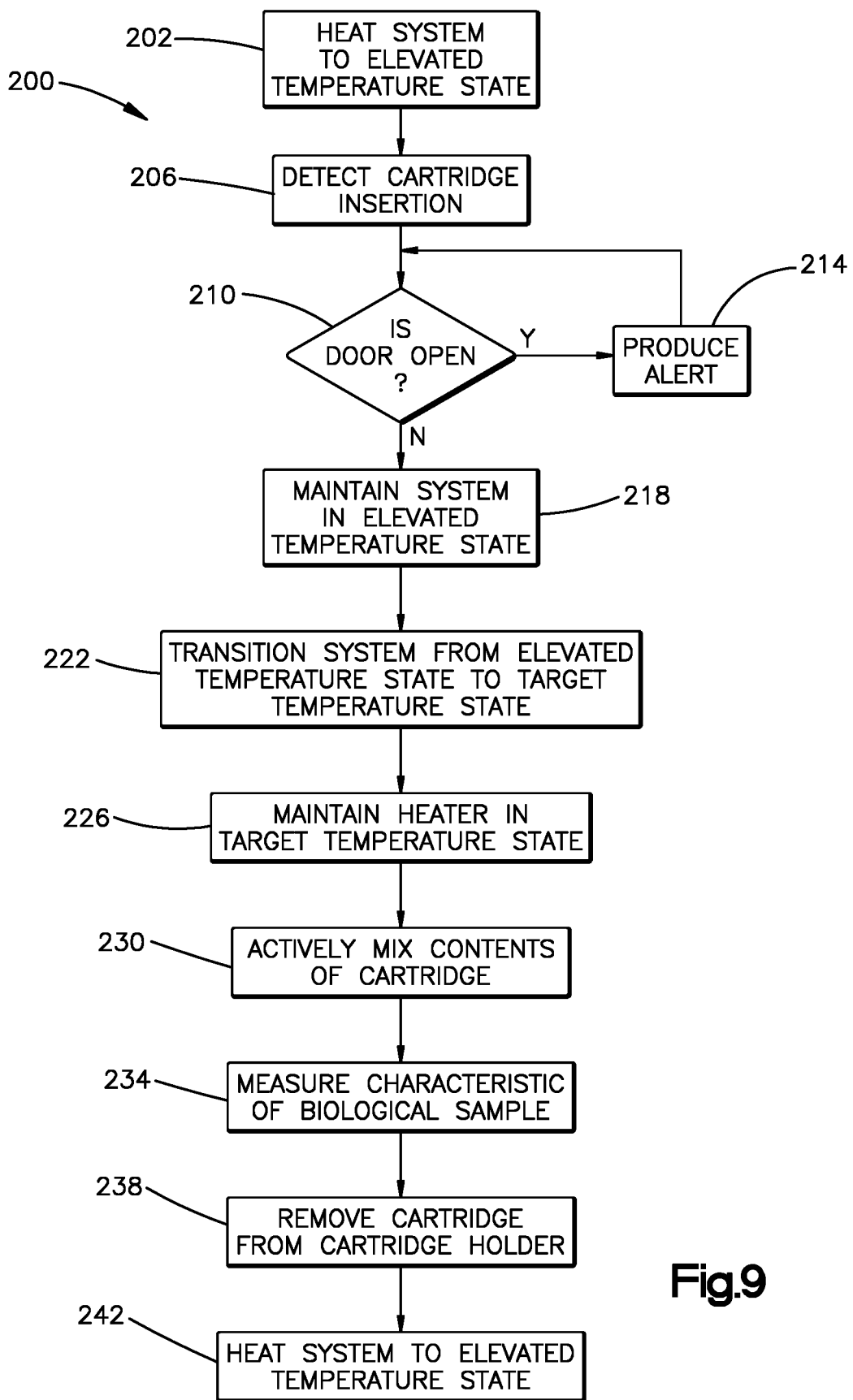
FIG. 9 shows a simplified flow diagram of a method of heating a biological sample to a target temperature.
Figure 11:
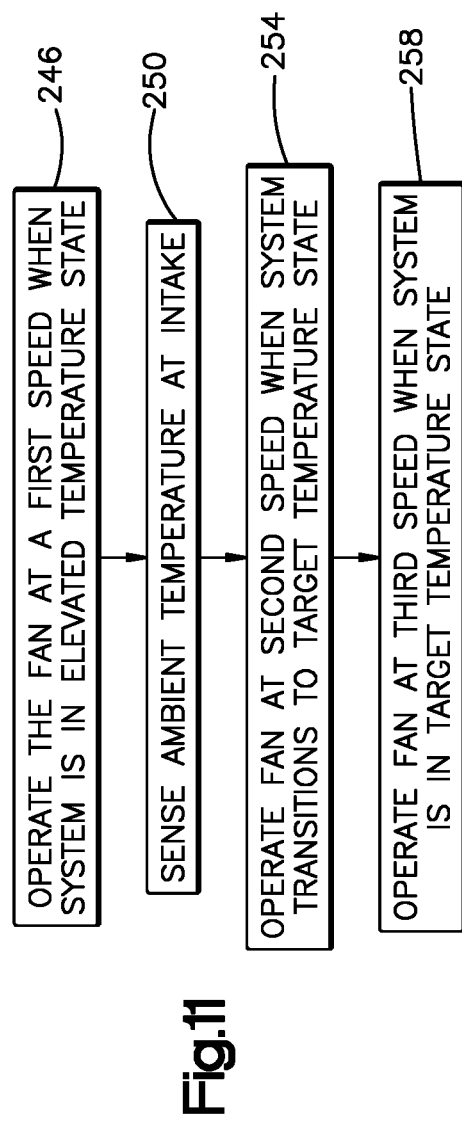
FIG. 11 shows a simplified flow diagram of a method of operating a fan of the biological sample analyzer.

Referring to FIGS. 9 and 11, a method of operating the fan 192 will now be described. In step 246, the controller 46 can direct the fan to operate at a first speed $S_1$ as the receptacle 154 is brought up to and maintained at the elevated temperature ET (from the from the initial time $t_0$ to the second time $t_2$ in FIG. 13). The first speed can also be referred to as an idle or low speed. In embodiments where the first speed $S_1$ is greater than zero, the air is forced through the air duct 120 of the plenum 100 and along the receptacle 154 at the first speed $S_1$. Operating the fan 192 at a first speed $S_1$ that is greater than zero can function to transfer excess heat to the air flowing through the plenum 100, and thus remove at least a portion of the excess heat with the air flowing out of the air exhaust 42 of the housing 14. This can prevent components in the system from overheating, and can prevent the temperature sensor 194 adjacent the fan 192 that measures the ambient temperature of the air from producing biased measurements as a result of the heat produced by the heater 186.

While the fan 192 is operated at the first speed $S_1$, the temperature sensor 194 can sense the ambient temperature AT of the air entering the biological sample analyzer 10 through the air intake 38 in step 250 and transmit the ambient temperature to the controller 46. The controller 46 can use the ambient temperature AT sensed by the temperature sensor 194 in the calculations described above for determining various temperatures in the heating profile. In step 254, the controller 46 can direct the fan 192 to increase speed from the first speed $S_1$ to the second speed $S_2$ as the heater 186 transitions the receptacle 154 from the elevated temperature ET to the target temperature TT as shown in FIG. 13. In FIG. 12, this occurs during the second time $t_2$. The fan 192 can be operated at the second speed $S_2$ during the second period of time, which is from the second time $t_2$ to the third time $t_3$. The second speed $S_2$, which is faster than the first speed $S_1$, can also be referred to as a medium speed. The fan 192 thus forces air through the air duct 120 of the plenum 100 and along the receptacle 154 at the second speed $S_2$. As the fan 192 is operated at the second speed $S_2$, heat can be transferred from the receptacle 154 to the air forced through the plenum 100 at a quicker rate than otherwise occurs when the fan 192 is operated at the first speed $S_1$. This further aids in preventing the consumable holder 162 from overheating past the target temperature TT.

In step 258, once the receptacle 154 has reached the target temperature TT at the third time $t_3$ (as shown in FIG. 12), the controller 46 can direct the fan 192 to reduce speeds from the second speed $S_2$ to a third speed $S_3$. The third speed $S_3$ is less than the second speed $S_2$. For example, the third speed $S_3$ can be equal to the first speed $S_1$, or can be another speed another speed below the second speed $S_2$, as shown in FIG. 13. Step 258 can be performed while the heater 186 is maintaining the receptacle 154 at the target temperature TT. Like step 246, operating the fan 192 at the third speed $S_3$ in step 258 can function to transfer excess heat to the air flowing through the plenum 100, and thus remove some of the excess heat with the air flowing out of the air exhaust 42 of the housing 14.

As described above, the biological sample analyzer 10 can include a filter 196. If the controller 46 senses that the power consumption of the heater 186 is below expected, the controller 46 can recognize that the filter 196 may be clogged and can subsequently direct the fan 192 to operate during the temperature decay at an elevated speed that is higher than the second speed $S_2$. Operating the fan 192 at the elevated speed can compensate for the reduced amount of air that is entering the air plenum 100 as a result of the clogged filter 196, which allows the biological sample analyzer 10 to continue performing heating and sensing operations as normal. As a result, the working life of the filter 196 can be extended. In addition to transitioning the fan 192 to the elevated speed when the filter 196 is clogged, the controller 46 can also produce an alert via the HMI device 54 that indicates to the operator of the biological sample analyzer 10 that the filter 196 is clogged and may require replacement.

Figure 10:
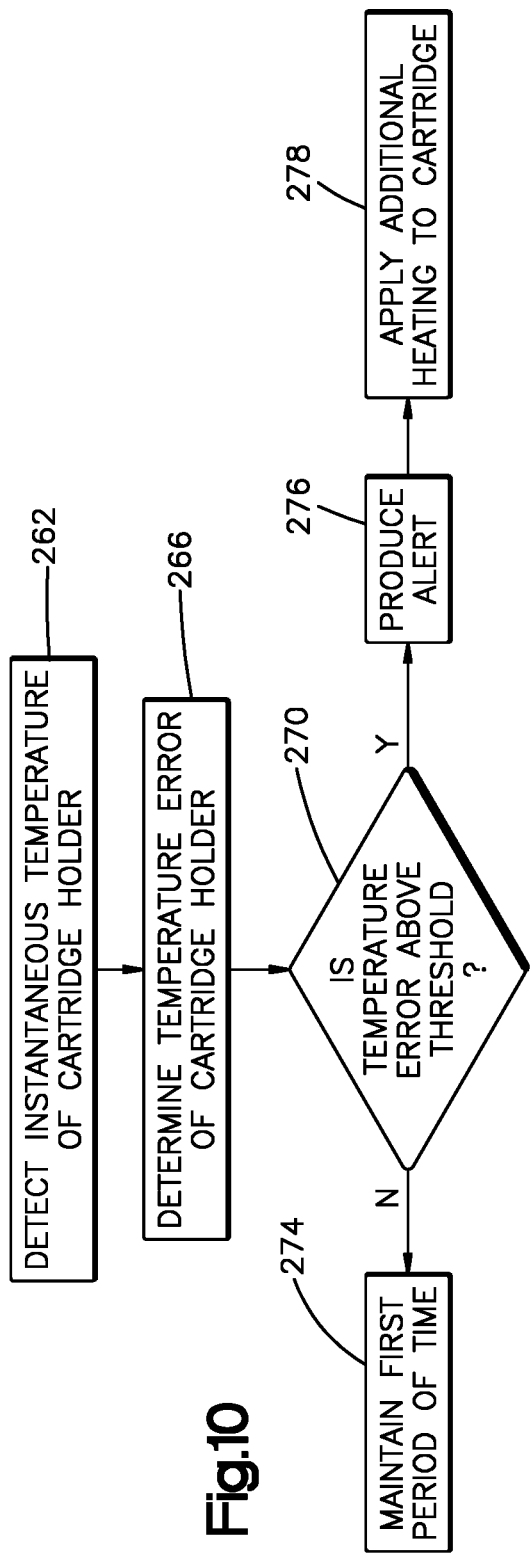
FIG. 10 shows a simplified flow diagram of a method of detecting a cold consumable holder and compensating for the cold consumable holder.

Referring to FIGS. 9 and 10, as described above, in some instances, an operator could insert a cold consumable holder into the biological sample analyzer 10 before allowing the consumable holder to reach ambient temperature. The biological sample analyzer 10 can be configured to detect a cold consumable holder and apply additional heating to the cold consumable holder so as to heat the cold consumable holder to the target temperature for analysis. FIG. 10 shows a method of operating the biological sample analyzer 10 that includes detecting a cold consumable holder and applying additional heating to a detected cold consumable holder so as to heat the cold consumable holder to the target temperature for analysis. The method of FIG. 10 can be implemented as part of step 206 in FIG. 9. In general, the sample analyzer 10 can be configured to detect whether the consumable holder is below an ambient temperature based on a decrease in temperature of the receptacle when the consumable holder is inserted into the receptacle. Based on the detection, the analyzer 10 can be configured to 1) control the at least one heater to apply a first amount of thermal energy to the consumable holder when the controller detects that the consumable holder is not below the ambient temperature so as to heat the consumable holder to a target temperature, and 2) control the at least one heater apply a second amount of thermal energy, greater than the first amount of thermal energy, to the consumable holder when the controller detects that the consumable holder is below the ambient temperature so as to heat the consumable holder to the target temperature.

As described above, when an unheated (i.e., cold or ambient temperature) consumable holder 162 is inserted into the receptacle 154, the lower temperature of the consumable holder 162 in relation to the receptacle 154 (which has been heated to the elevated temperature ET in step 202) will cause the temperature of the receptacle 154 to drop measurably. This temperature drop will cause an increase in the temperature error (e.g., the difference between the desired temperature and the temperature detected by the at least one heater sensor 188). The temperature drop for a cold consumable holder will be more rapid than that for an ambient temperature consumable holder. Therefore, the increase in temperature error will be more significant for a cold consumable holder than for an ambient temperature consumable holder. However, insertion of the cold consumable holder may take time (e.g., 5 seconds) to have an effect on the temperature of the receptacle 154 that could be used to identify the consumable holder 162 as a cold consumable holder. Eventually, as the feedback loop returns the receptacle 154 to the elevated temperature ET, the temperature error will be driven back towards zero.

In steps 262-270, the controller 46 determines whether the consumable holder is below the ambient temperature AT and is thus a cold consumable holder. In particular, in step 262, each of the at least one heater sensor 188 detects an initial temperature of the receptacle 154 after the consumable holder 162 is inserted into the receptacle 154. Preferably, this initial temperature is taken after an initial period of time so as to allow effects of the cold consumable holder to be experienced by the receptacle 154, but before the receptacle 154 returns to the elevated temperature ET. For example, the initial temperature can be measured in seconds after insertion of the consumable holder, such as one second, two seconds, three seconds, four seconds, five seconds, six seconds, seven seconds, eight seconds, nine seconds, or ten seconds after consumable holder insertion. In a preferred embodiment, the initial temperature is taken at five seconds after insertion of the consumable holder. The initial period of time can be based on the thermal time constant of the system, which is the time needed for the at least one heater sensor 188 to respond to a change in temperature. In step 266, the controller 46 can determine an initial temperature error of the receptacle 154 based on the initial temperature taken in step 262.

In step 270, the controller 46 can compare the initial temperature error to a predetermined threshold. If the initial temperature error is within the predetermined threshold (e.g., above or below as appropriate based on how the error is calculated), then the controller 46 can determine that the consumable holder 162 is not a cold consumable holder, and the consumable holder 162 can be heated as described above in relation to the first period of time FP (step 274). If, on the other hand, the temperature error is outside of the predetermined threshold (e.g., above or below as appropriate based on how the error is calculated), then the controller 46 can determine that the consumable holder 162 is a cold consumable holder and can determine that additional heating is needed to heat the consumable holder 162 to the target temperature (step 278). In one embodiment, the predetermined threshold can be based on, for example, an expected temperature error, such as (without limitation) a maximum expected temperature, for a non-cold consumable holder at the ambient temperature AT measured by the temperature sensor 194. If the initial temperature error is outside of a specified range of the expected temperature error (e.g., greater than 20 percent of the expected temperature error), then the controller 46 can determine that the consumable holder 162 is a cold consumable holder. In such a case, the controller 46 can optionally determine an estimate of an extended first period of time needed to heat the consumable holder 162 to the target temperature based on the initial temperature error. In one example, the estimate of the extended first period of time can be calculated as shown in Equation (4):

$$EFP_E = FP \frac{TE_i}{TE_E} + FP_C \quad (4)$$

where:
  $EFP_E$ is an estimate of the extended first period of time;
  FP is the first period of time discussed above;
  $TE_i$ is the initial temperature error;
  $TE_E$ is the expected temperature error; and
  $FP_C$ is a constant.

In step 276, the controller 46 can optionally notify the operator that a cold consumable holder is detected. The notification can be provided to the operator via the HMI device 54, which can produce an alert indicating this condition to the operator. In some embodiments, the controller 46 can provide the estimate of the additional heating time to the operator. The operator may choose to take manual action in response to the relative cold condition of the consumable holder 162, if desired.

In step 278, the controller 46 can apply additional heating to the receptacle 154 by increasing the thermal energy transferred to the consumable holder 162. This increase in thermal energy transfer can aid in driving the temperature error to zero. In one embodiment, the thermal energy transferred can be increased by increasing the power provided to the heater 186, which can cause the heater 186 to increase its temperature. However, in such embodiments, the at least one heater 186 may require significantly more wattage, which may negatively affect the cost and accuracy of the heating system. In an alternative embodiment, the controller 46 can increase the first period of time during which the receptacle 154 is maintained at the elevated temperature. For example, this increase can be up to about 60 seconds, based upon the extent to which the temperature error is outside the predetermined range.

Therefore, in step 278, the controller 46 can determine an actual extended first period of time $EFP_A$ to be used to heat the consumable holder 162 to the target temperature. Further, the controller 46 can cause the at least one heater 186 to heat the receptacle 154 to the elevated temperature ET for the actual extended first period of time $EFP_A$ in lieu of the first period of time FP discussed above. The actual extended first period of time $EFP_A$ can be determined based on a summation of a set of the detected temperature errors that are detected by the at least one heater sensor 188 over time for a particular consumable holder 162 so as to provide a more accurate determination than using a single temperature error (as used in the estimated extended first period of time $EFP_E$ above). In one example, the actual extended first period of time can be calculated as shown in Equation (5):

$$EFP_A = FP \frac{\Sigma TE_S}{\Sigma TE_E} \quad (5)$$

where:
  $EFP_A$ is the actual extended first period of time;
  FP is the first period of time discussed above;
  $\Sigma TE_S$ is the sum of the detected temperature errors in the set; and
  $\Sigma TE_E$ is the sum of the expected temperature errors.

In the Equation (5), the first temperature error in the sum of detected temperature errors $\Sigma TE_S$ can correspond to about the time that a consumable holder is inserted into the receptacle 154, although other starting temperature errors can be employed. The last temperature error in the sum $\Sigma TE_S$ corresponds to a temperature error has not been driven to zero (i.e., before the receptacle 154 reaches the elevated temperature ET). In one embodiment, the last temperature error in the set can correspond to a temperature error that is within a specified percentage of a detected maximum temperature error, although other ending temperature errors can be employed. For example, the specified percentage can be about 75 percent, where the last temperature error in the set would correspond to period where the temperature of the receptacle 154 is increasing and the temperature error is decreasing. The controller 46 can identify the detected maximum temperature error from the temperature errors that are accumulated over time for the particular consumable holder 162, and determine the last temperature error of the set from the detected maximum temperature error.

Biological sample analyzers of the present disclosure may provide one or more benefits over conventional analyzers, including one or more of the following benefits. For example, a biological sample analyzer of the present disclosure may be capable of detecting when an inserted consumable holder is a cold consumable holder and adjusting heating of the cold consumable holder to bring the consumable holder of the desired target temperature, whereas a conventional analyzer might not be capable of compensating for a cold consumable holder. This can reduce biases or errors in results of the sample analysis that can occur due to a consumable holder not being properly heated to the target temperature. As another example, a biological sample analyzer of the present disclosure may be capable of heating a consumable holder with a given mass to a target temperature faster than a comparable conventional analyzer. This can result in shorter wait times for measurement results, and shorter wait times between biological analyses of separate consumable holders. As yet another example, a biological sample analyzer of the present disclosure may be capable of cooling its heaters quicker than a comparable conventional analyzer due to the focused air flow over the heaters through the plenum. The focuses air flow can also enable an analyzer of the present disclosure to be operated at a higher temperature than the target temperature so as to more quickly heat a consumable holder.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Illustrative Embodiments

The foregoing description will be understood with reference to the following illustrative embodiments. It should be understood, however, that the application is not limited to the precise illustrative embodiments discussed below.

Illustrative Embodiment 1: A biological sample analyzer, comprising: a housing having at least one outer wall that defines an internal cavity therein;
a receptacle disposed within the internal cavity, the receptacle configured to support a consumable holder containing a biological sample;
at least one heater configured to apply heat to the consumable holder when the consumable holder is supported by the receptacle;
at least one heater sensor configured to detect a temperature of the receptacle; and
a controller configured to 1) direct the at least one heater to heat to an elevated temperature before the consumable holder is disposed in the receptacle, and 2) direct the at least one heater to heat the consumable holder to a target temperature, less than the elevated temperature, by i) applying the elevated temperature to the consumable holder and ii) subsequently reducing an amount of heat applied to the consumable holder before the consumable holder exceeds the target temperature.

Illustrative Embodiment 2: The biological sample analyzer of Illustrative Embodiment 1, wherein the controller is configured to direct the at least one heater to maintain the receptacle at the elevated temperature during a first period of time after the consumable holder is disposed in the receptacle.

Illustrative Embodiment 3: The biological sample analyzer of Illustrative Embodiment 2, wherein the controller is configured to direct the at least one heater to reduce the amount of heat applied to the consumable holder by directing the at least one heater to decrease its temperature from the elevated temperature to the target temperature during a second period of time that is after the first period of time.

Illustrative Embodiment 4: The biological sample analyzer of Illustrative Embodiment 3, comprising a sensor configured to measure a characteristic of the biological sample, wherein the controller is configured to direct the at least one heater to maintain the target temperature while the sensor measures the characteristic of the biological sample.

Illustrative Embodiment 5: The biological sample analyzer of Illustrative Embodiment 4, wherein the controller is configured to direct the at least one heater to heat the receptacle to the elevated temperature after the sensor measures the characteristic of the biological sample and the consumable holder is removed from the receptacle.

Illustrative Embodiment 6: The biological sample analyzer of Illustrative Embodiment 5, wherein the at least one outer wall of the housing defines an air intake and an air exhaust, and the biological sample analyzer comprises a fan configured to force air along a path that extends from the air intake, along the receptacle, and to the air exhaust so as to cool the at least one heater.

Illustrative Embodiment 7: The biological sample analyzer of Illustrative Embodiment 6, comprising a temperature sensor positioned adjacent the fan, wherein the temperature sensor is configured to measure an ambient temperature of the air.

Illustrative Embodiment 8: The biological sample analyzer of any one of Illustrative Embodiments 6 and 7, wherein the controller is configured to operate the fan at a first speed when the at least one heater is at the elevated temperature, and at a second speed, greater than the first speed, as the temperature of the at least one heater is decreasing from the elevated temperature to the target temperature.

Illustrative Embodiment 9: The biological sample analyzer of Illustrative Embodiment 8, wherein the controller is configured to direct the fan to operate at the first speed when the sensor measures the characteristic of the biological sample.

Illustrative Embodiment 10. The biological sample analyzer of any one of Illustrative Embodiments 1 to 9, wherein the at least one heater includes a first heater attached to a first side of the receptacle and a second heater attached to a second side of the receptacle opposite the first side, and the at least one heater sensor includes a first heater sensor attached to the receptacle adjacent the first heater and a second heater sensor attached to the receptacle adjacent the second heater.

Illustrative Embodiment 11: The biological sample analyzer of any one of Illustrative Embodiments 1 to 10, wherein the housing defines a housing opening configured to receive the consumable holder therethrough and into the receptacle, the housing including a door configured to provide access to the receptacle, wherein the door is configured to be moved between an open position, wherein the housing is configured to receive the consumable holder through the opening and into the receptacle, and a closed position, wherein the door covers the housing opening.

Illustrative Embodiment 12: The biological sample analyzer of Illustrative Embodiment 11, comprising a door sensor configured to detect whether the door is open, wherein the controller is configured to produce an alert when the door sensor senses that the door is open for a specified period of time.

Illustrative Embodiment 13: The biological sample analyzer of any one of Illustrative Embodiments 1 to 12, wherein:
  the controller is configured to determine temperature errors over time, wherein each temperature error is based on a desired temperature and a detected temperature received from the at least one heater sensor; and
  the controller is configured adjust heat applied by the at least one heater to the receptacle based on the temperature errors so as to heat the receptacle to the desired temperature.

Illustrative Embodiment 14: A method of operating a biological sample analyzer, the method comprising:
  causing at least one heater to heat a receptacle supported in an internal cavity of a housing of the biological sample analyzer to an elevated temperature;
  inserting a consumable holder containing a biological sample into the receptacle such that the receptacle applies heat to the consumable holder at the elevated temperature; and
  causing the at least one heater to reduce an amount of heat applied to the receptacle before the consumable holder exceeds a target temperature, less than the elevated temperature, so as to prevent the consumable holder from exceeding the target temperature.

Illustrative Embodiment 15: The method of Illustrative Embodiment 14, wherein causing the at least one heater to reduce an amount of heat applied to the receptacle comprises causing a fan to force air around the receptacle so as to cool the receptacle.

Illustrative Embodiment 16: The method of any one of Illustrative Embodiments 14 and 15, wherein causing at least one heater supported by the receptacle to heat the receptacle to an elevated temperature comprises adjusting heat applied by the at least one heater to the receptacle based on temperature errors, where each temperature error is determined based on a detected temperature received from at least one heater sensor supported by the receptacle and a desired temperature.

Illustrative Embodiment 17: The method of any one of Illustrative Embodiments 14 to 16, comprising maintaining the receptacle at the elevated temperature for a first period of time after the consumable holder is received in the receptacle.

Illustrative Embodiment 18: The method of Illustrative Embodiment 17, wherein reducing the amount of heat applied to the consumable holder includes decreasing a temperature of the at least one heater from the elevated temperature to the target temperature over a second period of time that is after the first period of time.

Illustrative Embodiment 19: The method of any one of Illustrative Embodiments 14 to 18, comprising causing a sensor to measure a characteristic of the biological sample while maintaining the at least one heater at the target temperature.

Illustrative Embodiment 20: The method of Illustrative Embodiment 19, comprising directing the at least one heater to heat the receptacle to the elevated temperature after the sensor measures the characteristic of the biological sample and the consumable holder is removed from the receptacle.

What is claimed:

1. A biological sample analyzer, comprising:
   a housing having at least one outer wall that defines an internal cavity therein;
   a receptacle disposed within the internal cavity, the receptacle having a receiving area configured to receive therein a consumable holder containing a biological sample;
   at least one heater attached to the receptacle and configured to apply heat to the receptacle when the consumable holder is not received therein and when the consumable holder is received therein;
   at least one heater sensor attached to the receptacle and configured to detect a temperature of the receptacle; and
   a controller in signal communication with the at least one heater and the at least one heater sensor and configured via a software application to 1) direct the at least one heater to heat the receptacle to an elevated temperature before the consumable holder is disposed in the receptacle, and 2) direct the at least one heater to heat the receptacle with the consumable holder disposed therein to a target temperature, which is less than the elevated temperature, by i) applying the elevated temperature to the receptacle with the consumable holder disposed therein and ii) subsequently reducing an amount of heat applied to the receptacle with the consumable holder disposed therein before the consumable holder exceeds the target temperature.

2. The biological sample analyzer of claim 1, wherein the controller is configured to direct the at least one heater to maintain the receptacle at the elevated temperature during a first period of time after the consumable holder is disposed in the receptacle.

3. The biological sample analyzer of claim 2, wherein the controller is configured to direct the at least one heater to reduce the amount of heat applied to the consumable holder by directing the at least one heater to decrease its temperature from the elevated temperature to the target temperature during a second period of time that is after the first period of time.

4. The biological sample analyzer of claim 3, comprising a biological analysis sensor in signal communication with the controller and configured to measure a characteristic of the biological sample, wherein the controller is configured to direct the at least one heater to maintain the target temperature while the biological analysis sensor measures the characteristic of the biological sample.

5. The biological sample analyzer of claim 4, wherein the controller is configured to direct the at least one heater to heat the receptacle to the elevated temperature after the biological analysis sensor measures the characteristic of the biological sample and the consumable holder is removed from the receptacle.

6. The biological sample analyzer of claim 5, wherein the at least one outer wall of the housing defines an air intake and an air exhaust, and the biological sample analyzer further comprises a fan configured to force air along a path in the cavity that extends from the air intake, through a plenum disposed within the cavity along the receptacle, at least a portion of which is received in the plenum, and to the air exhaust so as to cool the at least one heater.

7. The biological sample analyzer of claim 6, comprising a temperature sensor in signal communication with the controller and positioned adjacent the fan, wherein the temperature sensor is configured to measure an ambient temperature of the air drawn into the plenum by the fan.

8. The biological sample analyzer of claim 6, wherein the controller is configured to operate the fan at a first speed when the at least one heater is at the elevated temperature, and at a second speed, greater than the first speed, as the temperature of the at least one heater is decreasing from the elevated temperature to the target temperature.

9. The biological sample analyzer of claim 8, wherein the controller is configured to direct the fan to operate at the first speed when the biological analysis sensor measures the characteristic of the biological sample.

10. The biological sample analyzer of claim 1, wherein the at least one heater includes a first heater attached to a first side of the receptacle and a second heater attached to a second side of the receptacle opposite the first side, and the at least one heater sensor includes a first heater sensor attached to the receptacle adjacent the first heater and a second heater sensor attached to the receptacle adjacent the second heater.

11. The biological sample analyzer of claim 1, wherein the housing defines a housing opening configured to receive the consumable holder therethrough and into the receptacle, the housing including a door configured to provide access to the receptacle, wherein the door is configured to be moved between an open position, wherein the housing is configured to receive the consumable holder through the opening and into the receptacle, and a closed position, wherein the door covers the housing opening.

12. The biological sample analyzer of claim 11, comprising a door sensor in signal communication with the controller and configured to detect whether the door is open, wherein the controller is configured to produce an alert when the door sensor senses that the door is open for a specified period of time.

13. The biological sample analyzer of claim 1, wherein:
the controller is configured to determine temperature errors over time, wherein each temperature error is based on a desired temperature and a detected temperature received at the controller from the at least one heater sensor; and
the controller is configured to adjust heat applied by the at least one heater to the receptacle based on the temperature errors so as to heat the receptacle to the desired temperature.

* * * * *